(12) United States Patent
Kling et al.

(10) Patent No.: US 9,483,488 B2
(45) Date of Patent: Nov. 1, 2016

(54) VERIFYING SEPARATION-OF-DUTIES AT IAM SYSTEM IMPLEMENTING IAM DATA MODEL

(71) Applicant: Bank of America Corporation, Charlotte, NC (US)

(72) Inventors: John Kling, Bellevue, KY (US); Bryan Thompson, Frisco, TX (US); Ward Green, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 241 days.

(21) Appl. No.: 13/945,669

(22) Filed: Jul. 18, 2013

(65) Prior Publication Data

US 2014/0181913 A1    Jun. 26, 2014

Related U.S. Application Data

(63) Continuation-in-part of application No. 13/801,314, filed on Mar. 13, 2013.

(60) Provisional application No. 61/740,205, filed on Dec. 20, 2012.

(51) Int. Cl.
*G06F 17/30*    (2006.01)
*G06F 21/62*    (2013.01)
*H04L 29/06*    (2006.01)

(52) U.S. Cl.
CPC ......... *G06F 17/30165* (2013.01); *G06F 21/62* (2013.01); *H04L 63/10* (2013.01); *H04L 63/101* (2013.01)

(58) Field of Classification Search
CPC ............. G06F 17/30165; G06F 21/62; G06F 21/6218; G06F 2221/2141; H04L 63/10; H04L 63/101; H04L 63/102; H04L 63/104
USPC ................................................ 707/781, 783
See application file for complete search history.

(56) References Cited

U.S. PATENT DOCUMENTS 5,574,927 A    11/1996  Scantlin
5,649,099 A     7/1997  Theimer et al.
(Continued)

FOREIGN PATENT DOCUMENTS

EP    0707264 A2    4/1996

OTHER PUBLICATIONS

Tuebora Access Nirvana, "Tuebora IAM Service," Tuebora, Inc., California, 2012. Retrieved from [http://www.tuebora.com/] on Mar. 27, 2014.
(Continued)

*Primary Examiner* — Thu-Nguyet Le
(74) *Attorney, Agent, or Firm* — Banner & Witcoff, Ltd.; Michael A. Springs

(57) ABSTRACT

Systems and methods of verifying separation-of-duties (SoD) for requested access rights to physical computing resources are provided. An SoD verifier may receive and access request and obtain a set of current permissions associated with a requestee specified in the access request. The SoD verifier may also obtain a set of new permissions to provision for the requestee based on the access request. The SoD verifier may determine whether one of the current permissions is incompatible with one of the new permissions. The SoD verifier may provide an indication of whether the access request represents an SoD violation.

19 Claims, 19 Drawing Sheets

(56) References Cited

U.S. PATENT DOCUMENTS

| | | | |
|---|---|---|---|
| 5,889,953 A | 3/1999 | Thebaut et al. | |
| 5,987,611 A | 11/1999 | Freund | |
| 6,321,334 B1 | 11/2001 | Jerger et al. | |
| 6,400,726 B1 | 6/2002 | Piret et al. | |
| 6,434,559 B1 | 8/2002 | Lundberg et al. | |
| 6,460,141 B1 | 10/2002 | Olden | |
| 6,738,973 B1 | 5/2004 | Rekimoto | |
| 6,748,447 B1 | 6/2004 | Basani et al. | |
| 6,947,989 B2 | 9/2005 | Gullotta et al. | |
| 6,968,385 B1 | 11/2005 | Gilbert | |
| 6,983,278 B1 | 1/2006 | Yu et al. | |
| 7,075,895 B1 | 7/2006 | Hanam | |
| 7,260,689 B1 | 8/2007 | Xu et al. | |
| 7,614,082 B2 | 11/2009 | Adams et al. | |
| 7,630,974 B2 | 12/2009 | Remahl et al. | |
| 7,657,453 B2 * | 2/2010 | Guldner | G06Q 10/00 705/7.11 |
| 7,739,245 B1 | 6/2010 | Agarwal et al. | |
| 7,831,642 B1 | 11/2010 | Kumaresan et al. | |
| 7,895,638 B2 | 2/2011 | Becker et al. | |
| 8,121,913 B2 | 2/2012 | Bracken et al. | |
| 8,135,633 B1 | 3/2012 | LeBaron et al. | |
| 8,160,904 B1 | 4/2012 | Smith | |
| 8,196,195 B2 | 6/2012 | Bartley et al. | |
| 8,204,907 B1 | 6/2012 | Smith | |
| 8,230,434 B2 | 7/2012 | Armstrong et al. | |
| 8,306,854 B1 | 11/2012 | Bray et al. | |
| 8,458,337 B2 | 6/2013 | Corley et al. | |
| 8,533,168 B2 | 9/2013 | Kuehr-McLaren et al. | |
| 8,539,556 B1 | 9/2013 | Brandwine | |
| 8,543,607 B2 | 9/2013 | Sreedhar | |
| 8,555,403 B1 | 10/2013 | Kilday | |
| 8,613,051 B2 | 12/2013 | Nguyen | |
| 8,635,689 B2 | 1/2014 | Hernandez et al. | |
| 8,639,622 B1 | 1/2014 | Moore et al. | |
| 8,645,843 B2 | 2/2014 | Chee et al. | |
| 8,661,534 B2 | 2/2014 | Chatterjee et al. | |
| 8,688,813 B2 | 4/2014 | Maes | |
| 8,700,581 B2 | 4/2014 | Paknad et al. | |
| 8,706,692 B1 | 4/2014 | Luthra et al. | |
| 8,775,593 B2 | 7/2014 | O'Sullivan et al. | |
| 8,964,990 B1 | 2/2015 | Baer et al. | |
| 9,244,818 B1 | 1/2016 | Paleja | |
| 9,246,945 B2 | 1/2016 | Chari et al. | |
| 2002/0095322 A1 | 7/2002 | Zarefoss | |
| 2002/0099825 A1 | 7/2002 | Fertell et al. | |
| 2002/0156816 A1 | 10/2002 | Kantrowitz et al. | |
| 2002/0156904 A1 | 10/2002 | Gullotta et al. | |
| 2002/0169876 A1 | 11/2002 | Curie et al. | |
| 2003/0005333 A1 | 1/2003 | Noguchi et al. | |
| 2003/0061404 A1 | 3/2003 | Atwal et al. | |
| 2003/0083846 A1 | 5/2003 | Curtin et al. | |
| 2003/0221012 A1 | 11/2003 | Herrmann et al. | |
| 2004/0010463 A1 | 1/2004 | Hahn-Carlson et al. | |
| 2004/0034582 A1 | 2/2004 | Gilliam et al. | |
| 2004/0158455 A1 | 8/2004 | Spivack et al. | |
| 2004/0181771 A1 * | 9/2004 | Anonsen | G06F 8/20 717/100 |
| 2004/0186798 A1 | 9/2004 | Blitch et al. | |
| 2004/0210580 A1 | 10/2004 | Butler et al. | |
| 2004/0267552 A1 | 12/2004 | Gilliam et al. | |
| 2005/0021360 A1 | 1/2005 | Miller et al. | |
| 2005/0027948 A1 | 2/2005 | Marlan et al. | |
| 2005/0097353 A1 * | 5/2005 | Patrick | H04L 63/105 726/26 |
| 2005/0114226 A1 | 5/2005 | Tripp et al. | |
| 2005/0143231 A1 | 6/2005 | Turnbull et al. | |
| 2005/0160411 A1 | 7/2005 | Sangal et al. | |
| 2005/0187852 A1 | 8/2005 | Hwang | |
| 2005/0227694 A1 | 10/2005 | Hayashi | |
| 2005/0262188 A1 | 11/2005 | Mamou et al. | |
| 2005/0288978 A1 | 12/2005 | Furland et al. | |
| 2006/0005256 A1 | 1/2006 | Cox | |
| 2006/0015450 A1 | 1/2006 | Guck et al. | |
| 2006/0031679 A1 | 2/2006 | Soltis et al. | |
| 2006/0136582 A1 | 6/2006 | Mills | |
| 2006/0137019 A1 | 6/2006 | Dettinger et al. | |
| 2006/0143685 A1 | 6/2006 | Vasishth et al. | |
| 2006/0155738 A1 | 7/2006 | Baldwin et al. | |
| 2006/0178898 A1 | 8/2006 | Habibi | |
| 2006/0190985 A1 | 8/2006 | Vasishth et al. | |
| 2006/0293029 A1 | 12/2006 | Jha et al. | |
| 2007/0005601 A1 | 1/2007 | Gaucas | |
| 2007/0006284 A1 | 1/2007 | Adams et al. | |
| 2007/0022315 A1 | 1/2007 | Comegys | |
| 2007/0053381 A1 | 3/2007 | Chacko et al. | |
| 2007/0129960 A1 | 6/2007 | Farrell | |
| 2007/0156912 A1 | 7/2007 | Crawford | |
| 2007/0185814 A1 | 8/2007 | Boccon-Gibod et al. | |
| 2007/0214497 A1 | 9/2007 | Montgomery et al. | |
| 2007/0233531 A1 | 10/2007 | McMahon | |
| 2007/0233600 A1 | 10/2007 | McMahon | |
| 2007/0245013 A1 | 10/2007 | Saraswathy et al. | |
| 2008/0005321 A1 | 1/2008 | Ma et al. | |
| 2008/0040810 A1 | 2/2008 | Kurokawa | |
| 2008/0052102 A1 | 2/2008 | Taneja et al. | |
| 2008/0060058 A1 | 3/2008 | Shea et al. | |
| 2008/0120302 A1 | 5/2008 | Thompson et al. | |
| 2008/0133907 A1 | 6/2008 | Parkinson | |
| 2008/0148253 A1 | 6/2008 | Badwe et al. | |
| 2008/0215509 A1 | 9/2008 | Charlton | |
| 2008/0244604 A1 | 10/2008 | Bennington et al. | |
| 2008/0244605 A1 | 10/2008 | Bennington et al. | |
| 2008/0256568 A1 | 10/2008 | Rowland | |
| 2008/0288330 A1 | 11/2008 | Hildebrand et al. | |
| 2008/0306985 A1 | 12/2008 | Murray et al. | |
| 2008/0313703 A1 | 12/2008 | Flaks et al. | |
| 2008/0320603 A1 | 12/2008 | Ito | |
| 2009/0063691 A1 | 3/2009 | Kalofonos et al. | |
| 2009/0089291 A1 * | 4/2009 | Daily | G06Q 10/10 |
| 2009/0132813 A1 | 5/2009 | Schibuk | |
| 2009/0138960 A1 | 5/2009 | Felty et al. | |
| 2009/0150981 A1 | 6/2009 | Amies et al. | |
| 2009/0172674 A1 | 7/2009 | Bobak et al. | |
| 2009/0287529 A1 | 11/2009 | Johnson | |
| 2009/0307597 A1 | 12/2009 | Bakman | |
| 2009/0313079 A1 | 12/2009 | Wahl | |
| 2009/0320088 A1 * | 12/2009 | Gill | G06F 21/604 726/1 |
| 2010/0061249 A1 | 3/2010 | Rius I Riu et al. | |
| 2010/0077458 A1 | 3/2010 | Stout et al. | |
| 2010/0131526 A1 | 5/2010 | Sun et al. | |
| 2010/0161634 A1 | 6/2010 | Caceres | |
| 2010/0217639 A1 | 8/2010 | Wayne et al. | |
| 2010/0228989 A1 | 9/2010 | Neystadt et al. | |
| 2010/0250688 A1 | 9/2010 | Sachs et al. | |
| 2010/0250730 A1 | 9/2010 | Menzies et al. | |
| 2010/0318446 A1 | 12/2010 | Carter | |
| 2010/0319051 A1 | 12/2010 | Bafna et al. | |
| 2010/0333167 A1 | 12/2010 | Luo et al. | |
| 2011/0004085 A1 | 1/2011 | Mensinger et al. | |
| 2011/0072018 A1 | 3/2011 | Walls et al. | |
| 2011/0107436 A1 | 5/2011 | Cholas et al. | |
| 2011/0113493 A1 | 5/2011 | Moore | |
| 2011/0128886 A1 | 6/2011 | Husney | |
| 2011/0173545 A1 | 7/2011 | Meola | |
| 2011/0191213 A1 | 8/2011 | Mora et al. | |
| 2011/0239044 A1 | 9/2011 | Kumar et al. | |
| 2011/0264278 A1 | 10/2011 | Gilbert et al. | |
| 2011/0265150 A1 | 10/2011 | Spooner et al. | |
| 2011/0288907 A1 | 11/2011 | Harvey et al. | |
| 2011/0302622 A1 | 12/2011 | Bregman et al. | |
| 2012/0029969 A1 | 2/2012 | Franke et al. | |
| 2012/0030072 A1 | 2/2012 | Boudreau et al. | |
| 2012/0030073 A1 | 2/2012 | Boudreau et al. | |
| 2012/0042354 A1 * | 2/2012 | Vitiello et al. | 726/1 |
| 2012/0079556 A1 | 3/2012 | Wahl | |
| 2012/0088540 A1 | 4/2012 | Smith et al. | |
| 2012/0095797 A1 | 4/2012 | Nishimura et al. | |
| 2012/0098638 A1 | 4/2012 | Crawford | |
| 2012/0102489 A1 | 4/2012 | Staiman et al. | |
| 2012/0110670 A1 | 5/2012 | Mont et al. | |
| 2012/0134550 A1 | 5/2012 | Knoplioch et al. | |
| 2012/0151512 A1 | 6/2012 | Talbert et al. | |

(56) References Cited

U.S. PATENT DOCUMENTS

| | | |
|---|---|---|
| 2012/0173728 A1 | 7/2012 | Haskins et al. |
| 2012/0185454 A1 | 7/2012 | Zhang |
| 2012/0216243 A1 | 8/2012 | Gill et al. |
| 2012/0221347 A1 | 8/2012 | Reiner |
| 2012/0233312 A1 | 9/2012 | Ramakumar et al. |
| 2012/0240242 A1 | 9/2012 | Ferenczi et al. |
| 2012/0266073 A1 | 10/2012 | Tanaka et al. |
| 2012/0266228 A1 | 10/2012 | Dash et al. |
| 2012/0278708 A1 | 11/2012 | Jesudasan et al. |
| 2012/0278903 A1 | 11/2012 | Pugh |
| 2012/0297456 A1 | 11/2012 | Rose et al. |
| 2012/0317565 A1 | 12/2012 | Carrara et al. |
| 2013/0013548 A1 | 1/2013 | Alexander et al. |
| 2013/0031070 A1 | 1/2013 | Ducharme et al. |
| 2013/0042294 A1 | 2/2013 | Colvin et al. |
| 2013/0046884 A1 | 2/2013 | Frost et al. |
| 2013/0067093 A1 | 3/2013 | Moreno et al. |
| 2013/0067538 A1 | 3/2013 | Dharmarajan et al. |
| 2013/0080520 A1 | 3/2013 | Kiukkonen et al. |
| 2013/0097223 A1 | 4/2013 | Mishkevich et al. |
| 2013/0111489 A1 | 5/2013 | Glew et al. |
| 2013/0198639 A1 | 8/2013 | Casco-Arias Sanchez et al. |
| 2013/0227638 A1 | 8/2013 | Giambiagi et al. |
| 2013/0246901 A1 | 9/2013 | Massand |
| 2013/0254866 A1 | 9/2013 | Koster et al. |
| 2013/0283356 A1 | 10/2013 | Mardikar et al. |
| 2013/0298202 A1 | 11/2013 | Warshavsky et al. |
| 2013/0312084 A1 | 11/2013 | Tandon |
| 2013/0316746 A1 | 11/2013 | Miller et al. |
| 2013/0326580 A1 | 12/2013 | Barclay et al. |
| 2013/0332984 A1 | 12/2013 | Sastry et al. |
| 2013/0333021 A1 | 12/2013 | Sellers et al. |
| 2014/0075492 A1 | 3/2014 | Kapadia et al. |
| 2014/0101061 A1 | 4/2014 | Boudreau et al. |
| 2014/0108404 A1 | 4/2014 | Chen et al. |
| 2014/0109168 A1 | 4/2014 | Ashley et al. |
| 2014/0143831 A1 | 5/2014 | Fieweger |
| 2014/0164544 A1 | 6/2014 | Gagneraud |
| 2014/0173035 A1 | 6/2014 | Kan et al. |
| 2014/0196115 A1 | 7/2014 | Pelykh |
| 2014/0207813 A1 | 7/2014 | Long et al. |
| 2014/0208399 A1 | 7/2014 | Ponzio, Jr. |
| 2014/0237498 A1 | 8/2014 | Ivins |
| 2014/0280961 A1 | 9/2014 | Martinez et al. |
| 2014/0282825 A1 | 9/2014 | Bitran et al. |
| 2014/0282880 A1 | 9/2014 | Herter et al. |
| 2014/0282922 A1 | 9/2014 | Iwanski et al. |
| 2014/0289402 A1 | 9/2014 | Moloian et al. |
| 2014/0289796 A1 | 9/2014 | Moloian et al. |
| 2014/0298423 A1 | 10/2014 | Moloian et al. |
| 2014/0331277 A1 | 11/2014 | Frascadore et al. |
| 2014/0337971 A1 | 11/2014 | Casassa Mont et al. |
| 2014/0359085 A1 | 12/2014 | Chen |
| 2014/0359695 A1 | 12/2014 | Chari et al. |
| 2014/0365353 A1 | 12/2014 | Shvarts |
| 2014/0379593 A1 | 12/2014 | Koehler et al. |
| 2014/0380058 A1 | 12/2014 | Agarwal et al. |
| 2015/0026823 A1 | 1/2015 | Ramesh et al. |
| 2015/0066572 A1 | 3/2015 | McLaren et al. |
| 2015/0082432 A1 | 3/2015 | Eaton et al. |
| 2015/0120520 A1 | 4/2015 | Prokopenko et al. |
| 2015/0154418 A1 | 6/2015 | Redberg |
| 2015/0163068 A1 | 6/2015 | Cudak et al. |
| 2015/0281239 A1 | 10/2015 | Brophy |
| 2015/0319760 A1 | 11/2015 | Wright et al. |
| 2015/0372890 A1 | 12/2015 | Fan et al. |

OTHER PUBLICATIONS

Tuebora Access Nirvana, "Access Request, Approval and Delivery," Tuebora, Inc., California, 2012. Retrieved from [http://www.tuebora.com/] on Mar. 27, 2014.

Tuebora Access Nirvana, "Access Change Monitoring," Tuebora, Inc., California, 2012. Retrieved from [http://www.tuebora.com/] on Mar. 27, 2014.

Tuebora Access Nirvana, "Access Certification—Recertification," Tuebora, Inc., California, 2012. Retrieved from [http://www.tuebora.com/] on Mar. 27, 2014.

Easter, C., "Method to Report Access Control of LAN Server Resources on a Per User Basis," IBM Technical Disclosure Bulletin, Apr. 1992, 1 page.

An Oracle White Paper, "Integrated Identity Governance," a Business Overview, 17 pages, Jul. 2012.

* cited by examiner

US 9,483,488 B2

VERIFYING SEPARATION-OF-DUTIES AT IAM SYSTEM IMPLEMENTING IAM DATA MODEL

CROSS-REFERENCE TO RELATED APPLICATIONS

This application is a continuation-in-part of U.S. Non-Provisional patent application Ser. No. 13/801,314 filed on Mar. 13, 2013 and entitled "COMMON DATA MODEL FOR IDENTITY ACCESS MANAGEMENT DATA," which claims priority to U.S. Provisional Patent Application No. 61/740,205 filed on Dec. 20, 2012 and entitled "COMMON DATA MODEL FOR IDENTITY ACCESS MANAGEMENT DATA," each of which are incorporated in their entirety in the present disclosure.

This application is also related to: U.S. patent application Ser. No. 13/945,638 entitled "Access Requests at IAM System Implementing IAM Data Model" and filed on Jul. 18 2013; U.S. patent application Ser. No. 13/945,656 entitled "Access Reviews at IAM System Implementing IAM Data Model" and filed on Jul. 18, 2013; and U.S. patent application Ser. No. 13/945,679 entitled "Reconciling Access Rights at IAM System Implementing IAM Data Model" and filed on Jul. 18, 2013 each of which are also incorporated by reference in their entirety in this disclosure.

TECHNICAL FIELD

Aspects of the present disclosure generally relate to provisioning access to computing resources and particularly relate to provisioning access to computing resources using an identity access management data model.

BACKGROUND

Identity and access management (IAM) refers to the processes, technologies, and policies for managing digital identities and controlling how those identities can be used to access resources. For large business entities having thousands of employees and complex computer systems, IAM can be a challenge.

As personnel join, leave, and move throughout the enterprise, access rights to various computing resources may need to be updated, e.g., to add, remove, or modify access rights. Furthermore, periodic access reviews may need to be performed to ensure that access rights for personnel do not exceed the scope of their authority. In other words, access reviews may be used to determine whether employees can access only those resources necessary to perform their job duties. Moreover, it may also be important to ensure personnel are not provided with incompatible access rights—combinations of access rights that would allow personnel to carry out incompatible tasks.

These aspects of IAM may be difficult in current implementations of IAM systems. In particular, current IAM systems may require business personnel to request changes to access rights in terms of the technical infrastructure underlying the enterprise computer system. Furthermore, provisioning access rights in conventional systems may be a manual process, which can lead to mistakes and inconsistencies in provisioned access rights. Erroneously provisioned access rights may lead to users having access to computing resources outside the scope of their authority. Additionally, current IAM systems may require business personnel to perform access reviews also in technical terms. Business personnel, however, may not be familiar nor concerned with the technical details of the enterprise computer system. As a result, business personnel may have difficulty requesting changes to access rights and conducting access reviews. Therefore, a need exists for improved approaches to submitting access requests and conducting access reviews.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

A first aspect described herein provides a computer-implemented method of verifying separation-of-duties (SoD) for requested access rights to physical computing resources. An SoD verifier may receive and access request and obtain a set of current permissions associated with a requestee specified in the access request. The SoD verifier may also obtain a set of new permissions to provision for the requestee based on the access request. The SoD verifier may determine whether one of the current permissions is incompatible with one of the new permissions. The SoD verifier may provide an indication of whether the access request represents an SoD violation.

A second aspect described herein provides a system for verifying separation-of-duties for requested access rights to physical computing resources. The system may include a processor and a data store that implements an identity access management (IAM) data model. The data store may store a set of logical computing resource records corresponding to one or more logical computing resources. The data store may also store a set of physical computing resource records corresponding to one or more physical computing resources. Through the IAM data model, the logical computing resource records may be respectively associated with one or more of the physical computing resource records.

An separation-of-duties verifier may receive an access request, identify a set of current permissions associated with a requestee specified in the access request, and identify a set of new permissions to provision for the requestee. The SoD verifier may determine whether one of the current permissions is incompatible with one of the new permissions and provide notification of whether the access request represents an SoD violation. The IAM data model may store a incompatible business task records that identify incompatible business tasks.

If the access request does not represent an SoD violation, an access request handler may initiate an adjustment of access rights to at least one physical computing resource based on the access request. If the access request does represent an SoD violation, the access request may be denied, and the requestor may be notified that the access request was denied. A reviewer may also be notified of the SoD violation. If the reviewer confirms the SoD violation, then the access request may be denied. If the reviewer dismisses the SoD violation, then the access request handler may initiate provisioning of the access rights.

The SoD verifier may obtain the current permissions based on an access request type and identify the new permissions based on the IAM data model. The SoD verifier may also determine whether an access request represents an SoD violation by determining whether current business task associated with one of the current permissions is incompatible with a new business task associated with one of the new permissions. The access request may specify a business role, business activity, or business task. The current permissions and new permissions may thus respectively include current and new logical permissions that are respectively associated with current and new business tasks of current and new business activities. The access request may also specify a logical permission or a physical permission specification. The current and new permissions may thus respectively include current permissions associated with a user account of a requestee and new physical permissions indicated in the physical permission specification.

A third aspect described herein provides a non-transitory computer-readable medium having instructions that, when executed by a processor, cause the processor to perform steps corresponding to various aspects described above.

These and other aspects of the present disclosure will be apparent in view of the detailed description provided below.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps disclosed may be optional. It will also be appreciated with the benefit of this disclosure that one or more components illustrated in the accompanying figures may be positioned in other than the disclosed arrangement and that one or more of the components illustrated may be optional.

DETAILED DESCRIPTION

Figure 1:
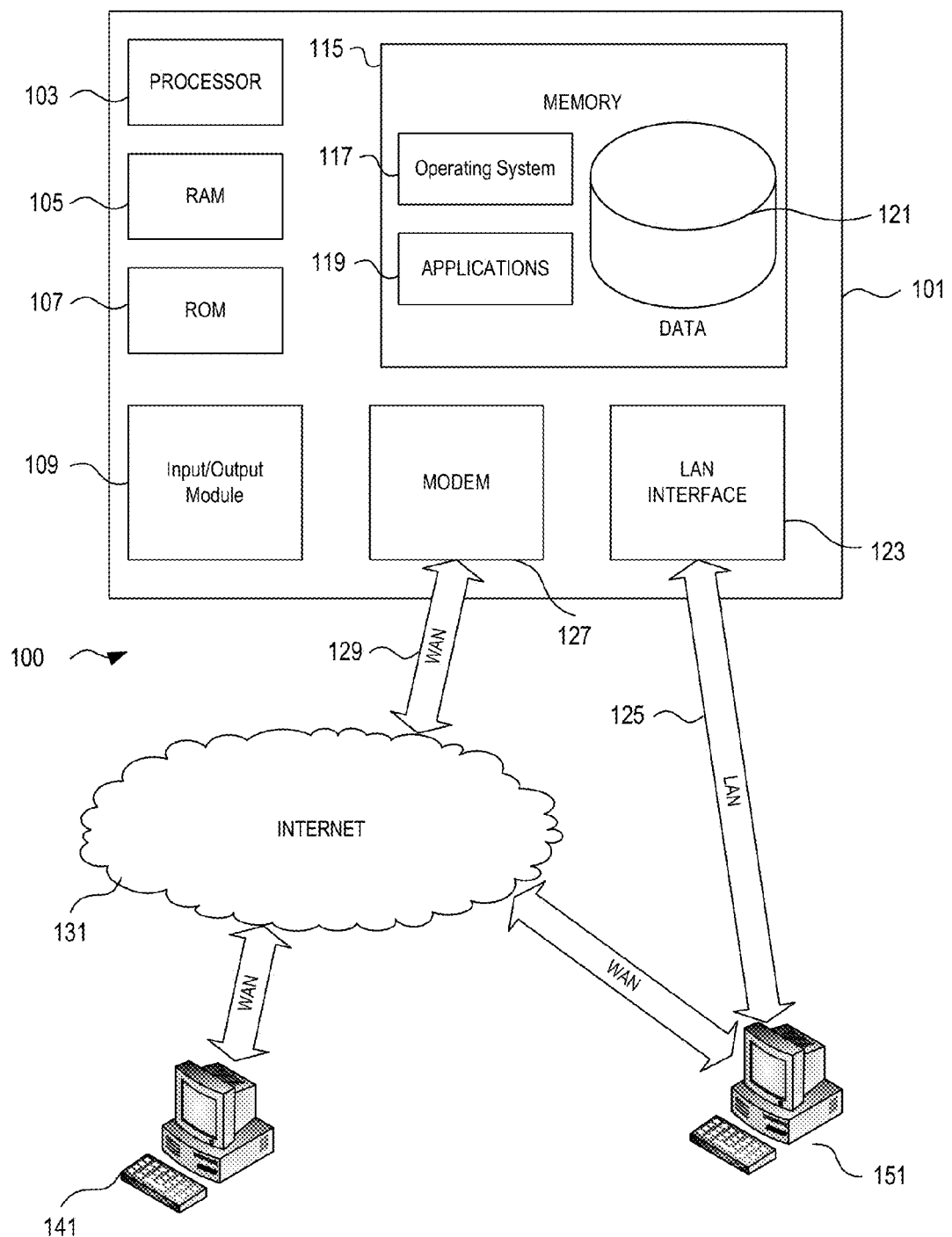
FIG. 1 is a block diagram of an example operating environment in which various aspects of the disclosure may be implemented.

Aspects of the present disclosure are directed towards provisioning access rights to physical computing resources and reviewing such access rights. Access requests and access reviews may be conducted with the assistance of an identity access management (IAM) system that implements an IAM data model. A data model for organizing and establishing relationships between IAM data is described in U.S. Provisional Patent App. No. 61/740,205 and U.S. patent application Ser. No. 13/801,314 each of which are incorporated in this disclosure in their entirety. The access request and access review features described below illustrate one of the many advantages of implementing a common IAM data model at the computer system of an enterprise. Aspects of the disclosure below may be described in the context of business enterprises and the computer systems of such business enterprises. It will be appreciated, however, that aspects of the present disclosure may selectively implemented at the computer systems of any type of enterprise.

The approaches to identity access management described below advantageously improve the process of requesting access rights at an enterprise computer system as well as the process of conducting access reviews. Not only do the improved approaches to IAM provide more efficiency within the enterprise, the approaches advantageously provide more security by reducing the possibility of unauthorized access to physical computing resources at the enterprise computer system.

In particular, the IAM system and corresponding IAM data model described in the present disclosure divide aspects of IAM into logical and physical aspects. The logical aspects are described in business terms familiar to the business personnel of the enterprise. The physical aspects are described in the physical or technical terms familiar to technology personnel. The IAM system and IAM data model of the present disclosure maintain a correspondence between the logical aspects and the physical aspects of the computer systems of an enterprise. As discussed in further detail below, the IAM system and IAM data model may include entities representing logical computing resources ("logical resources") and corresponding physical computing resources ("physical resources"), logical permissions and corresponding physical permissions, logical entitlements and corresponding physical entitlements, and other entities representing logical and physical aspects of identity access management.

In this way, business personnel may submit access requests and conduct access reviews with reference to the logical aspects of IAM and with reference to the business terms familiar to the business personnel. The correspondence between the logical and physical aspects may thus allow technology personnel to fulfill access requests with reference to the physical aspects of IAM and with reference to the technical terms of the enterprise computer system. As a result, business personnel need not understand the underlying infrastructure of the enterprise computer system when submitting access requests and conducting access reviews. The IAM system advantageously converts the logical aspects to corresponding physical aspects in order to fulfill the access requests. In addition, the IAM system converts the physical aspects to corresponding logical aspects for access reviews. These and other aspects will be appreciated with additional reference to the details set forth below.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition, "set" as used in this description refers to a collection that may include one element or more than one element. Moreover, aspects of the disclosure may be implemented in non-transitory computer-readable media having instructions stored thereon that, when executed by a processor, cause the processor to perform various steps described in further detail below. As used in this description, non-transitory computer-readable media refers to all computer-readable media with the sole exception being a transitory propagating signal.

FIG. 1 illustrates a block diagram of at least a portion of an IAM system 101 (e.g., a computer server) in communication system 100 that may be used according to an illustrative embodiment of the disclosure. The system 101 may have a processor 103 for controlling overall operation of the system and its associated components, including RAM 105, ROM 107, input/output (I/O) module 109, and memory 115.

I/O 109 may include a microphone, keypad, touch screen, and/or stylus through which a user of the IAM system 101 may provide input, and may also include one or more of a speaker for providing audio output and a video display device for providing textual, audiovisual and/or graphical output. Software may be stored within memory 115 and/or storage to provide instructions to processor 103 for enabling the system 101 to perform various functions. For example, memory 115 may store software used by the system 101, such as an operating system 117, application programs 119, and an associated database 121. Processor 103 and its associated components may allow the system 101 to run a series of computer-readable instructions to process and respond to access requests and to facilitate access reviews.

The system 101 may operate in a networked environment supporting connections to one or more remote computers, such as terminals 141 and 151. The terminals 141 and 151 may be personal computers or servers that include many or all of the elements described above relative to the system 101. Alternatively, terminal 141 and/or 151 may be a data store that is affected by the backup and retention policies stored on the system 101. The network connections depicted in FIG. 1 include a local area network (LAN) 125 and a wide area network (WAN) 129, but may also include other networks. When used in a LAN networking environment, the system 101 is connected to the LAN 125 through a network interface or adapter 123. When used in a WAN networking environment, the system 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, one or more application programs 119 used by the IAM system 101 according to an illustrative embodiment of the disclosure may include computer executable instructions for invoking functionality related to processing and responding to access requests and to facilitating access reviews.

The transaction analysis system 101 and/or terminals 141 or 151 may also be mobile terminals, such as smart phones, personal digital assistants (PDAs), etc. including various other components, such as a battery, speaker, and antennas (not shown).

The disclosure is operational with numerous other general purpose or special purpose computer system environments or configurations. Examples of well-known computer systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Figure 2:
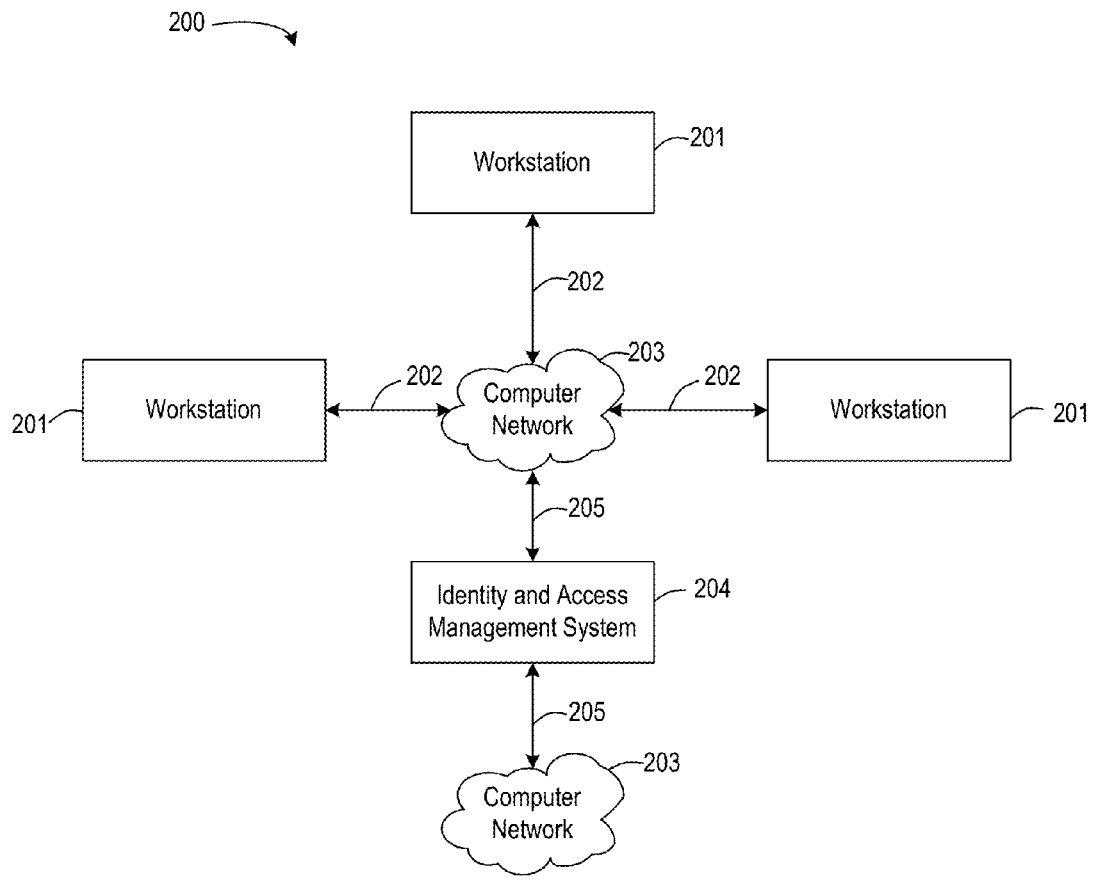
FIG. 2 is a block diagram of example workstations and servers that may be used to implement the processes and functions of one or more aspects of the present disclosure.

Referring to FIG. 2, an illustrative system 200 for implementing methods according to the present disclosure is shown. As illustrated, system 200 may include one or more workstations/servers 201. Workstations 201 may be local or remote, and are connected by one or more communications links 202 to computer network 203 that is linked via communications links 205 to the IAM system 204. In certain embodiments, workstations 201 may be different servers that communicate with the IAM system 204, or, in other embodiments, workstations 201 may be different points at which the IAM system 204 may be accessed. In system 200, the IAM system 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and the transaction analysis system 204, such as network links, dial-up links, wireless links, hard-wired links, etc.

The disclosure that follows in the figures may be implemented by one or more of the components in FIG. 1 and FIG. 2 and/or other components, including other computing devices.

Figure 3:
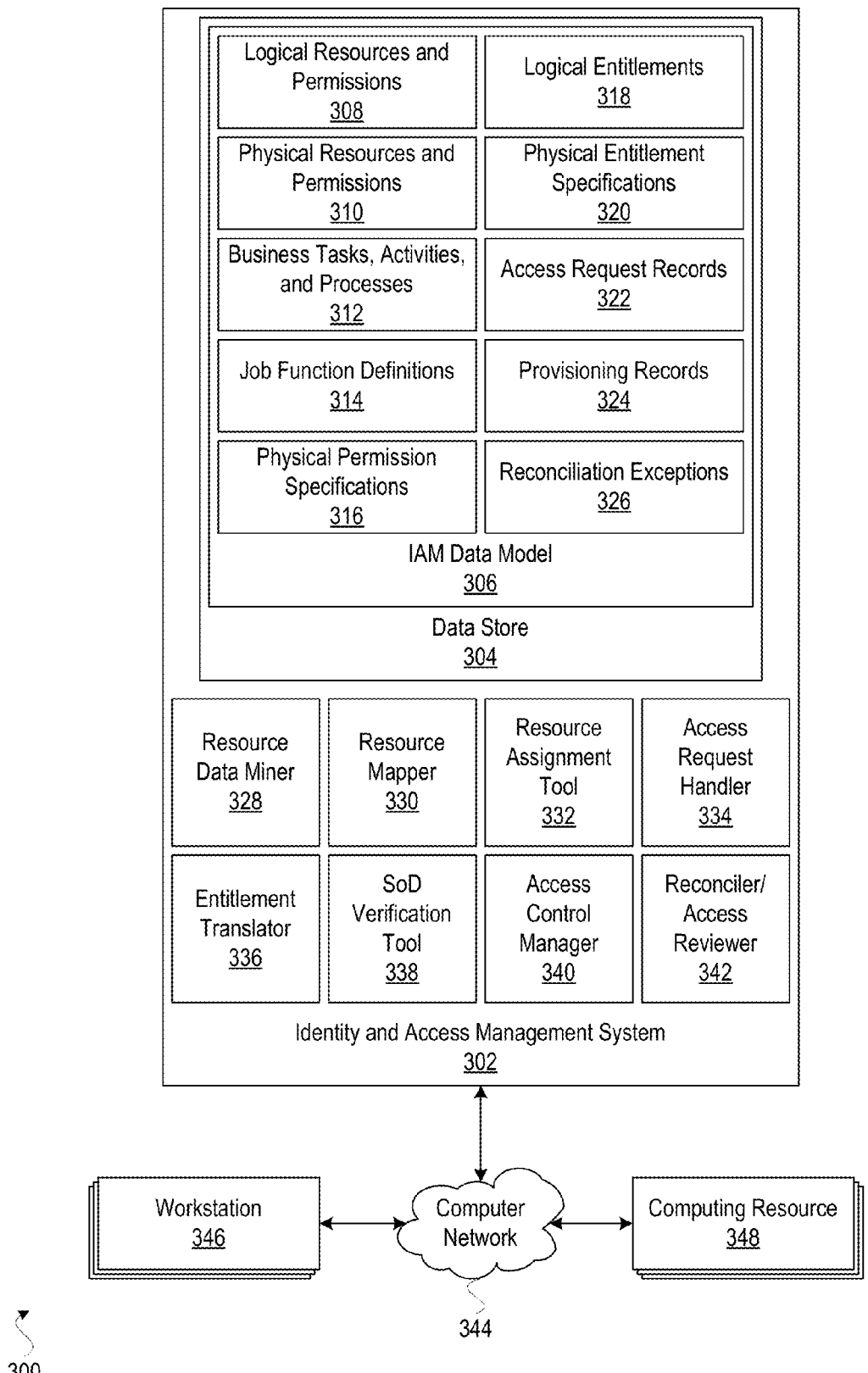
FIG. 3 is a block diagram of an example of an implementation of an identity access management (IAM) system.

Referring now to FIG. 3, a block diagram of an example computer system 300 that includes an identity access management (IAM) system 302 is shown. The IAM system 302 includes a data store 304 (e.g., a database) that implements an IAM data model 306. The IAM data model 306 may be similar to the IAM data model described in U.S. patent application Ser. No. 13/801,314, for which this application is a continuation-in-part. In this regard, the IAM data model may include various IAM data modeling elements such as: elements 308 relating to logical and resources and logical permissions; elements 310 relating to physical resources and physical permissions; elements 312 relating to tasks, business activities, and business processes; elements 314 relating to job function definitions; elements 316 relating to physical permission specifications; elements 318 relating to logical entitlements; and elements 320 relating to physical entitlement specifications. The data store 304 may store records in one or more tables that correspond to the elements described above. It will be appreciated that the records of these elements may include respective attributes to define and describe the element records.

The IAM system 302 may be employed to process and fulfill access requests by provisioning access rights to the computing components of the computer system 300, e.g., the physical computing resources. Accordingly, the data store 304 may also store access request records 322 and provisioning records 324. Provisioning records 324 may also be referred to as provisioned physical entitlements that indicate the physical computing resources a user account has been provisioned with access rights to. As discussed in further detail below, access request records 322 and provisioning records 324 may be utilized to reconcile access rights as requested with access rights as provisioned. If the access rights provisioned do not match the access rights requested, a reconciliation exception may be generated. The data store 304 may also store reconciliation exceptions 326 that describe the disparity between access rights as requested and access rights as provisioned as shown by way of example in FIG. 3. The IAM data model may establish relationships between the various elements 308-326. Example relationships between the elements 308-326 will be appreciated with reference to FIGS. 13-18 as well as to the figures in U.S. patent application Ser. No. 13/801,314. The data store 304 may also include a database management system (not shown) that controls the organization, storage, and retrieval of information in the data store.

The IAM system 302 also includes various modules for receiving and processing access requests and provisioning access rights to physical resources based on those access requests. The IAM system 302, in this example, includes: a resource data miner 328 that, in operation, processes source material to identify logical resources; a resource mapper 330 that, in operation, maps logical resources to physical resources; a resource assigner 332 that, in operation, assigns logical resources to business tasks; an access request handler 334 that, in operation, processes access requests and initiates the process of adjusting access rights; an entitlement translator 336 that, in operation, translates logical entitlements into physical entitlements; a separation-of-duties (SoD) verifier 338 that, in operation, verifies requested access rights are not incompatible with existing access rights for a user; an access control manager 340 that, in operation, initiates an adjustment of access rights to a resource for a user account or user account group; and reconciler 342 that, in operation, reconciles access rights as requested with access rights as provisioned. These modules 328-342 will be discussed in further detail below.

The IAM system 302 may be in signal communication via a network 344 with one or more workstations 346 and one or more computing resources 348. The workstations 346 may provide various interfaces (e.g., web-based portals or dashboards) for submitting access requests to the IAM system 302 and conducting access reviews. The computing resources 348 may represent the physical resources to which access is requested. In this regard, the computing resources 348 may include: information systems; software applications and programs; services; computing devices such as servers and workstations; network devices such as switches and routers; file systems; databases; and other types of physical computing resources. The IAM system 302 may receive access requests from the workstations 346 and process the access requests to provision access to one or more of the computing resources 348. As discussed in further detail below, the components of the IAM system may utilize the IAM data model to carry out their respective functions.

Figure 4:
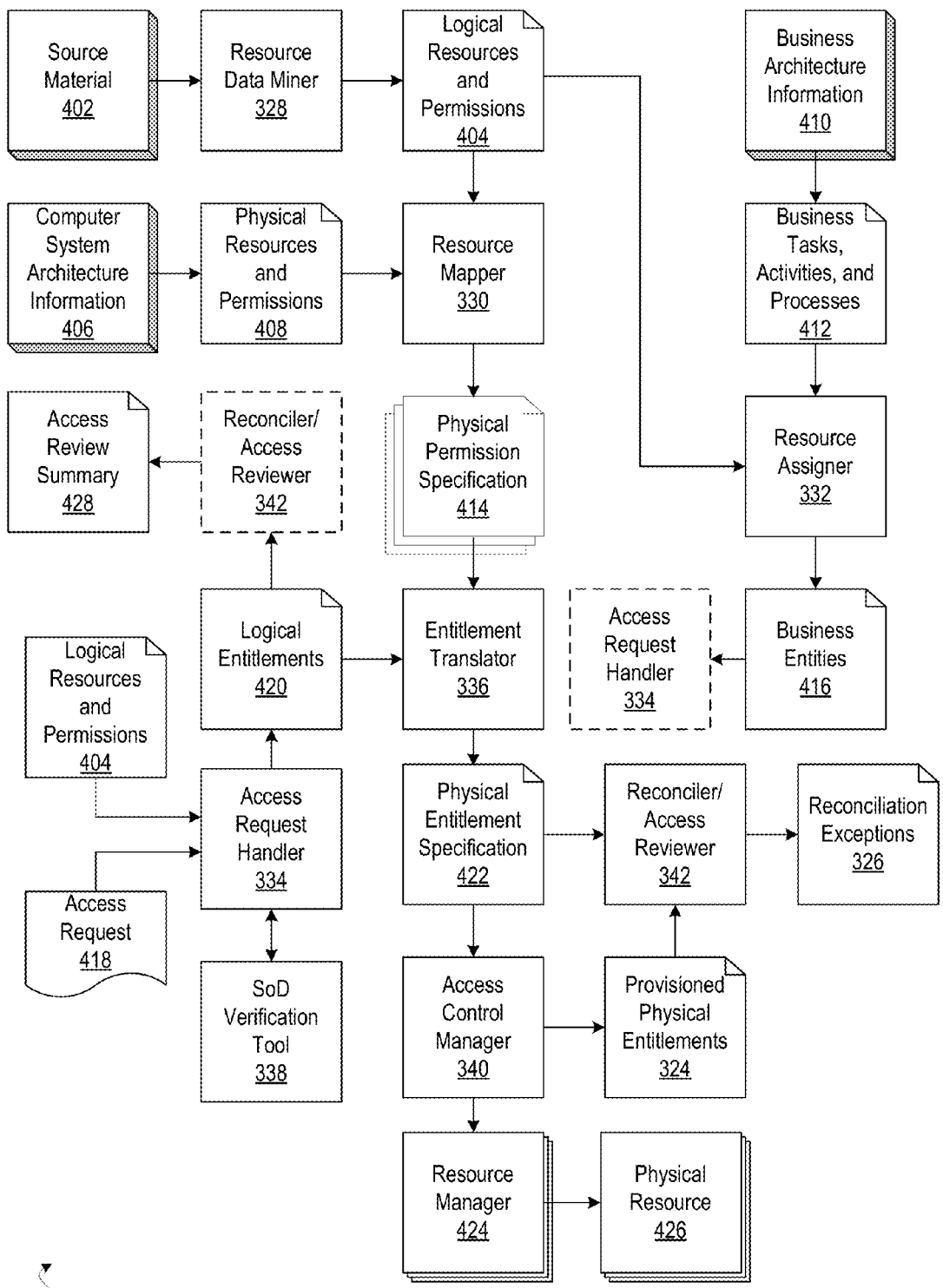
FIG. 4 is a block diagram of an example workflow for implementing an IAM system and processing access requests.

In FIG. 4 a block diagram of an example workflow 400 for implementing an IAM system 302 (FIG. 3), processing access requests, provisioning access rights, and reconciling access requests is shown. Access rights refer to the authority to perform types of access on resources. Examples of access rights include the ability to read information, write information, and execute actions. As discussed further below, resources include both logical resources and physical resources. Additionally, resources may also be associated with permissions and entitlements. Permissions refer to access rights to resources. Entitlements refer to permissions that are associated with a user or a group. As also discussed further below, permissions may include both logical and physical permissions, and entitlements may include both logical and physical entitlements.

The first stage in implementing an IAM system 302 for processing access requests involves establishing the IAM system itself and initializing the data store 304 by populating the IAM data model with information relating to the logical resources, physical resources, and business architecture of the enterprise. In this regard, the resource data miner 328 may receive and process source material 402 to identify the logical resources of the enterprise. The source material 402 may include, e.g., job aids, training materials, procedure manuals, and other types of materials that describe and define the job functions of the employees of the enterprise. The resource data miner 328 may be configured to extract and analyze the text of the source material 402 in order to identify a list 404 of logical resources and associated logical permissions. An IAM developer may review the list 404 of logical resources and permissions generated by the resource data miner 328 and edit the list, e.g., to revise logical resource names, remove proposed logical resources, and perform other types of edits to refine the list of logical resources and permission for the enterprise. Once the list 404 of logical resources and permissions is acceptable, logical computing resource records respectively corresponding to the set of logical resources and permissions may be created and stored in the data store 304. The data store 304 may organize the logical computing resource records in accordance with the IAM data model 306.

Logical resources refer to resources that are visible and accessible to an end user. Logical resources are implemented using physical resources that are not visible to the end user. An example of a logical resource includes the set of one or more screen interfaces utilized to maintain a customer account. Logical resources may be associated with logical permissions. Logical permissions refer to the set of access rights for a logical resource. In this regard, a logical permission may be understood as a pairing of a logical resource and an access right. Using the example of a customer account maintenance screen, examples of access rights include an access right to read information at the customer account maintenance screen and an access right to write information at the customer account maintenance screen. It will be appreciated that some end users may have the ability to read information at the customer account maintenance screen but not the ability to write information at the customer account maintenance screen. One example logical permission may thus be the combination of the read access right and the customer account maintenance screen.

In a similar fashion, information 406 describing the computer system architecture may be utilized to generate a list 408 of physical computing resources and corresponding physical permissions. Physical resources refer to computing resources that have been deployed at a computer system 300 of an enterprise. Examples of physical resources include transactions of a transaction server, files, and database tables. Examples of physical computing resources also include computing devices and systems such as servers, gateways, workstations, databases, and other types of computing devices and systems. Multiple physical resources may correspond to a single logical resource. For example, a logical resource may include a customer maintenance screen at which an end user may read and write customer profile and account information. Multiple physical resources may be associated with the customer maintenance screen including, e.g., the transaction used to invoke the customer maintenance screen, the transaction used to query the customer database for account and profile information, the computing device that hosts the customer database, the customer database itself, and the one or more database tables that organize customer profile and account information.

Physical permissions refer to the set of access rights for a physical resource. A physical permission is thus associated with a corresponding physical resource. As noted above, access rights may include the ability to read, write, or execute. Examples of physical permissions thus include the ability to execute a transaction at a transaction server, the ability to read a file stored at a data store, and the ability to write to a database table of a database. Examples of physical permissions may also include the ability to access various computing devices and systems such as those mentioned above. An access control manager may provide access control functionality at the computer system of the enterprise. Suitable computer security systems that provide access control functionality (e.g., authentication and authorization) and auditing functionality are commercially available and may be selectively employed.

Referring back to FIG. 4, information 410 describing the business architecture of the enterprise may be utilized to generate a list 412 of business tasks, business activities, and business processes of the enterprise. The business architecture information 410 may also be utilized to identify various business roles of the enterprise. Business tasks refer to a discrete unit of work that may have a defined set of inputs and outputs. Business activities refer to a set of one or more business tasks. In this regard, it will be appreciated that a business activity may include multiple business tasks and that a business task may be part of multiple business activities. Business processes refer to a set of one or more business activities. In this regard, it will also be appreciated that a business process may include multiple business activities and that a business activity may be part of multiple business processes. Business roles are associated with individuals (e.g., end users) and also refer to a set of one or more business activities. It will be appreciated that a business activity may be associated with multiple business roles. In the business context, examples of business roles include an entry-level role that performs entry-level business activities and a senior-level role that performs senior-level business activities.

Business tasks are associated with logical permissions, which thus indicate the logical resources used to carry out the business task. It will therefore be appreciated that a business activity may also be associated with logical resources and logical permissions through the business tasks of the business activity. Likewise, a business process and a business role may be associated with logical resources and logical permissions through the respective business activities of the business process and business role. In this way, the set of logical resources and permissions for a business activity, business process, and business role may also be advantageously determined through the IAM data model. Moreover, it will be appreciated that business tasks, activities, processes, and roles are part of the business architecture of the enterprise. In order to physically implement these aspects of the business architecture, the business tasks, activities, processes, and roles may be associated with one or more user account groups at the computer system 300 of the enterprise. More particularly, the logical aspects of IAM that relate to individuals, business roles, activities, and tasks may be implemented in the physical context as user accounts and user account groups. User accounts may be associated with one or more user account groups, and user account groups may be associated with other user account groups. In this way, a user account group that corresponds to a business role may be composed of groups corresponding to business activities.

As seen in FIG. 4, the resource mapper 330 may accept as input the list 404 of logical resources and permissions as well as the list 408 of physical resources and permissions. The resource mapper 330 may map the logical resources in the list 404 of logical resources to one or more physical resources in the list 408 of physical resources. The resource mapper 330 may also map the logical permissions associated with the logical resources to one or more physical permissions associated with the physical resources. The resource mapper 330 may be configured to map logical resources and permissions to corresponding physical resources and permissions automatically, manually, or through a combination of both automatic and manual mapping steps. The resource mapper 330 may generate and produce as output one or more physical permission specifications 414. A physical permission specification 414 describes the physical implementation of a logical permission—the set of physical permissions that, once provisioned, would provide a user access to the physical resources mapped to the logical resource. The resource mapper may generate a physical permission specification 414 for each logical permission. It will be appreciated that the physical permission specification 414 may specify one or multiple physical resources that map to the logical resource. The set of physical permission specifications 414 may also be referred to as a specification layer, which advantageously allows access rights to be provisioned for physical resources in a consistent manner.

In one example, a logical resource may include customer maintenance screens visible and accessible to an end user at a workstation. The corresponding physical resources may include the customer maintenance transactions available at a transaction server used to update a customer profile. Each transaction may be associated with a unique transaction code. Accordingly, the physical permission specification 414, in this example, may be a mapping of the appropriate transaction codes to the customer maintenance screens. Similar mappings may be utilized to map the customer maintenance screen to a machine that hosts the customer database, the customer database itself, and the customer tables of the customer database. In order to provide the end user with access to the logical resources, the IAM system 302 may provision access rights based on the physical permission specification 414. In this example, the IAM system 302 may provision access rights for the physical resources indicated in the physical permission specification 414.

As also seen in FIG. 4, the resource assigner 332 may accept as input the list 404 of logical resources and permissions as well as the list 412 of business tasks, activities, and processes. The resource assigner 332 may be utilized to assign logical resources and permissions to business tasks as described above. The resource assigner may also be utilized to define the job functions of business roles by assigning business activities to business roles. The resource assigner 332 may therefore generate and produce as output, e.g., a list 416 of business entities for the enterprise, e.g., business roles, business processes, business activities, and business tasks. The list 416 of business entities may identify for each business role, e.g., the business activities associated with a business role. The business role may thus be associated with logical resources and permissions through the relationship between business activities and business tasks. The business role may thereby also be associated with physical resources and permissions through the respective physical permission specifications 414 for the logical resources. In this way, logical resources and permissions as well as the physical resources and permissions associated with a business role may be advantageously determined. It will be appreciated that the resource assigner 332 may independently assign logical resources and logical permissions to business tasks, activities, and processes.

Having determined the resources, permissions, and business architecture for the enterprise, the IAM system 302 may receive and process access requests 418. The access request 418 may include information identifying, e.g., an access request type, an access request action, a requestor, a requestee, and a logical resource. A requestor may submit an access request based on, e.g., a business role, a business activity, a logical permission, a business unit, a physical permission specification, and other IAM or business architecture elements. The access request type specified in the access request thus identifies the basis for the access request. The access request action refers to the set of requested access rights, e.g., add, suspend, and revoke. Other types of access rights will be appreciated including create, add, provision, suspend, disable, remove, de-provision, modify, reinstate, activate, terminate, delete, enable, re-enable, and other types of access rights. Therefore, it will be appreciated that an access request refers to a change in access rights, which may include changing the access rights to a physical resource such that a user account may access the physical resource or removing access rights such that the user account cannot access the physical resource. The requestor information in the access request identifies the entity that submitted the access request, in other words, the user requesting the change to the access rights for the requestee. The requestor may be another user or a service or component of the enterprise computer system. The requestee refers to the entity for which the access rights should be changed. The specified requestee may be a single user, a group of users associated with a particular business role, a group of users associated with a particular business activity, or a service or component of the enterprise computer system. A requestee may also be a service or machine, and an access request may therefore request a change in access rights for the service or machine.

The IAM system 302 may also store respective records for each access request. These records may thus be referred to as access request records (322 in FIG. 3). An access request record may indicate the current status of an access request 418, e.g., submitted, approved, returned, modified/resubmitted, denied, and other types of statuses indicating the life cycle of the access request. The access request handler 334 may update the access request records in the data store 304 of the IAM system 302 during the life cycle of the access request 418.

Referring back to FIG. 4, the access request handler 334 may receive an access request 418 and process the access request. The access request handler 334 may perform various confirmation and validity checks on the access request 418 to determine whether to forward the access request for provisioning. If an access request 418 fails a confirmation or validity check, the access request handler 334 may, e.g., close the access request and notify the requestor of any deficiencies or violations. The access request handler 334 may also, e.g., return an access request 418 to the requestor for more information if the access request is missing any information needed to process the access request.

In some example implementations, the access request handler 334 may be configured to provide an access request to one or more reviewers for review and approval. If a reviewer does not approve the access request, the access request handler 334 may close the access request and notify the requestor that the access request was not approved. In some example implementations, the access request handler 334 may also pass the access request to a separation-of-duties (SoD) verifier 338 to confirm that the access request, if granted, would not result in a SoD violation. An SoD violation may occur where the access request, if granted, would associate incompatible business tasks with the end user. Incompatible business tasks refer to business tasks that should not be performed by the same person for reasons of security, integrity, or propriety. Accordingly, identifying incompatible business tasks allows for the identification of incompatible logical permissions through the IAM data model. If two business tasks are identified as incompatible, then, in some example implementations, the logical permissions respectively associated with those business tasks may be identified as incompatible logical permissions. The IAM data model 306 that organizes the IAM data of the IAM system 302, may include elements to associate business tasks such that the business tasks are identified as incompatible. It will be appreciated that these elements advantageously allow for a quick and efficient approach to determining when an access request would result in incompatible business tasks assigned to an end user. Separation-of-duties verification checks will be discussed in further detail below.

The access request handler 338 accepts as input the list 404 of logical resources and corresponding logical permissions. The access request handler 338 may thus identify the logical permissions for the logical resource specified in the access request 418 by matching the specified logical resource to the logical resource listed in the list 404 of logical resources and permissions. Based on the access request 418 and the list 404 of logical resources and permissions, the access request handler 338 may derive and produce a set 420 of logical entitlements Like resources and permissions, entitlements have both a logical and a physical aspect. A logical entitlement refers to the pairing of a logical permission and a user account (or user account group). Stated differently, a logical entitlement refers to a logical permission that is associated with a user account (or user account group). A physical entitlement refers to the pairing of a physical permission and a user account (or user account group). Stated differently, a physical entitlement refers to a physical permission that is associated with a user account (or user account group). A physical entitlement may also be referred to as an access control list. Moreover, when a user account is associated with a physical permission, the user account may be described as having a direct entitlement; and when the user account is associated with a group that is associated with the physical permission, the user account may be described as having an indirect entitlement.

In some circumstances, an individual may be assigned to a new business role. In physical terms, the user account associated with the individual may be assigned to or associated with the user account group corresponding to the business role. To provision access rights to the physical resources associated with the business role, an access request 418 may specify a business role for the user. In this example, the access request handler 334 may also receive the list of business entities 416 in order to identify the associated business activities, business tasks, and logical permissions associated with the requested business role. The access request handler may thus generate or construct the logical entitlements 420 for the access request 418 based on the logical permissions associated with the specified business role. In a similar fashion, the access request may specify a business process, business activity, or business task. The access request handler 334 may likewise generate or construct the logical entitlements 420 based on the business process, business activity, or business task specified in the access request 418.

The entitlement translator 336, in this example, translates the logical entitlements 420 associated with the access request 418 into a physical entitlement specification 422 that identifies a set of physical entitlements corresponding to the logical entitlements 420. The entitlement translator accepts as input the logical entitlements 420 associated with an access request 418 and the respective physical permission specifications 414 corresponding to the logical permissions of the logical entitlements. Through the physical permission specification 414, the entitlement translator 336 may identify the physical permissions associated with the logical permissions of the logical entitlements 420 for the access request 418. Stated differently, the entitlement translator 336 determines a set of physical entitlements based on the logical entitlements 420 generated by the access request handler 334 and the physical permission specifications 414 associated with the logical permissions of those logical entitlements. The physical entitlement specification 422 thus identifies the set of physical entitlements. It will be appreciated that the physical entitlement specification 422 includes the physical permissions that, if provisioned, would allow the user account of the requestee to access the physical resources associated with the logical resources specified in the access request 418. As noted above, an access request 418 may indicate that access rights should be revoked for the requestee. Accordingly, the physical permission specification 422 may also include physical permissions that, if de-provisioned, would prevent the user account of the requestee from accessing the physical resources associated with the logical resource specified in the access request.

The entitlement translator 336 may forward the physical entitlement specification 422 to the access control manager 340. The access control manager 340 may then adjust the access rights to the physical resources based on the physical entitlement specification 422. The access control manager 340 may be in signal communication with resource managers 424 that respectively manage access to respective physical resources 426. A resource manager 424 may be, e.g., a system-level or application-level function that manages access to one or more physical resources 426. Examples of resource managers and corresponding physical resources include, e.g., an operating system file manager that manages access to files and file systems, a database management system that manages access to database tables and views, and an application that uses application-level security to control access to application programs. A resource manager may also be referred to as a platform. The access control manager 340 may thus initiate provisioning or de-provisioning of access rights by interacting with one or more resource managers 424. The access control manager 340 may initiate an adjustment of access rights based on the physical entitlement specification 422 that identifies the physical resources 426.

The access control manager 340 and/or the resource managers 424 may also generate records identifying provisioned physical entitlements 324. The records for the provisioned physical entitlements 324 may thus identify the access rights as provisioned. Through the association with the physical entitlement specification 422, the provisioned physical entitlements 324 may also be associated with the access request 418. Accordingly, a provisioned physical entitlement may be traceable back to the access request 418. If the provisioned physical entitlement cannot be traced back to an access request (e.g., during an access review), then this may be an indication that access rights were erroneously provisioned for a user account. Upon identifying access rights that cannot be traced back to an access request, remedial measures may be taken to address the error such as, e.g., de-provisioning the physical entitlement.

It will also be appreciated that the provisioned physical entitlements 324 may be compared to the physical entitlement specification 422 in order to determine whether the physical entitlements as provisioned match the physical entitlements as specified. If the physical entitlements as provisioned do not match the physical entitlements as specified, then remedial measures may also be taken to align existing access rights for a user account with the access rights originally specified. In this regard, a reconciler 342 may accept as input the physical entitlement specification 422 and the provisioned physical entitlements 324, e.g., the current physical resources the account has access to. The reconciler may compare the physical entitlement specification 422 to the current physical resources accessible by a user account.

If a current physical resource accessible by a user account cannot be located in one of the physical entitlement specifications 422, the reconciler 342 may determine the user account is not authorized to access the physical resource. In turn, the reconciler 342 may generate a reconciliation exception 326. The data store 304 of the IAM system 302 may store records of reconciliation exceptions 326. A reconciliation exception 326 may indicate the access rights and physical resource that cannot be found in the physical entitlement specifications associated with the user account. It will be appreciated that the reconciler 342 may generate a reconciliation exception 326 when a physical entitlement was provisioned but not specified as well as when a physical entitlement was specified but not provisioned. In some example implementations, the reconciler 342 may be configured to respond to the reconciliation exception 326 by automatically generating a new access request 418. The reconciler 342 may submit the new access request 418 to the access request handler 334 as described above. The new access request 418 may, e.g., request that access rights be provisioned for physical entitlements that were not (but should have) been provisioned. The new access request 418 may also, e.g., request that access rights be revoked for physical resources that were (but should not have been) provisioned. In this way, the IAM system 302 may advantageously manage at least some of the access rights in an automated fashion. The reconciler may also, in some example implementations, respond to the reconciliation exception by notifying (e.g., via email) a reviewer of the reconciliation exception.

In view of this disclosure reconciling physical resources refers to determining whether a user account has access to the physical resources specified in the physical entitlement specifications for the user account and whether the user account has access to physical resources that the physical entitlement specifications do not specify. Physical resources that are specified in the physical entitlement specifications for a user account may be referred to as authorized physical resources. In some circumstances, a user account may be authorized to access a physical resource but has not yet been provisioned with access rights to the physical resource such that the physical resource the user account is entitled to is not yet accessible to the user account. Authorized physical resources that are not yet accessible to the user account may be referred to as pending physical resources. In contrast, physical resources that are accessible to a user account but are not specified in any of the physical entitlement specifications for the user account may be referred to as unauthorized computing resources. It will thus be appreciated that the reconciliation exception may identify the physical resource associated with the reconciliation exception as well as whether the physical resource is an unauthorized physical resource or a pending physical resource. If the physical resource is an unauthorized physical resource, the reconciler may generate a new access request to revoke the access rights to the unauthorized physical resource. If the physical resource is a pending physical resource, then the reconciler may generate a new access request to provision access rights to the pending physical resource.

Figure 5:
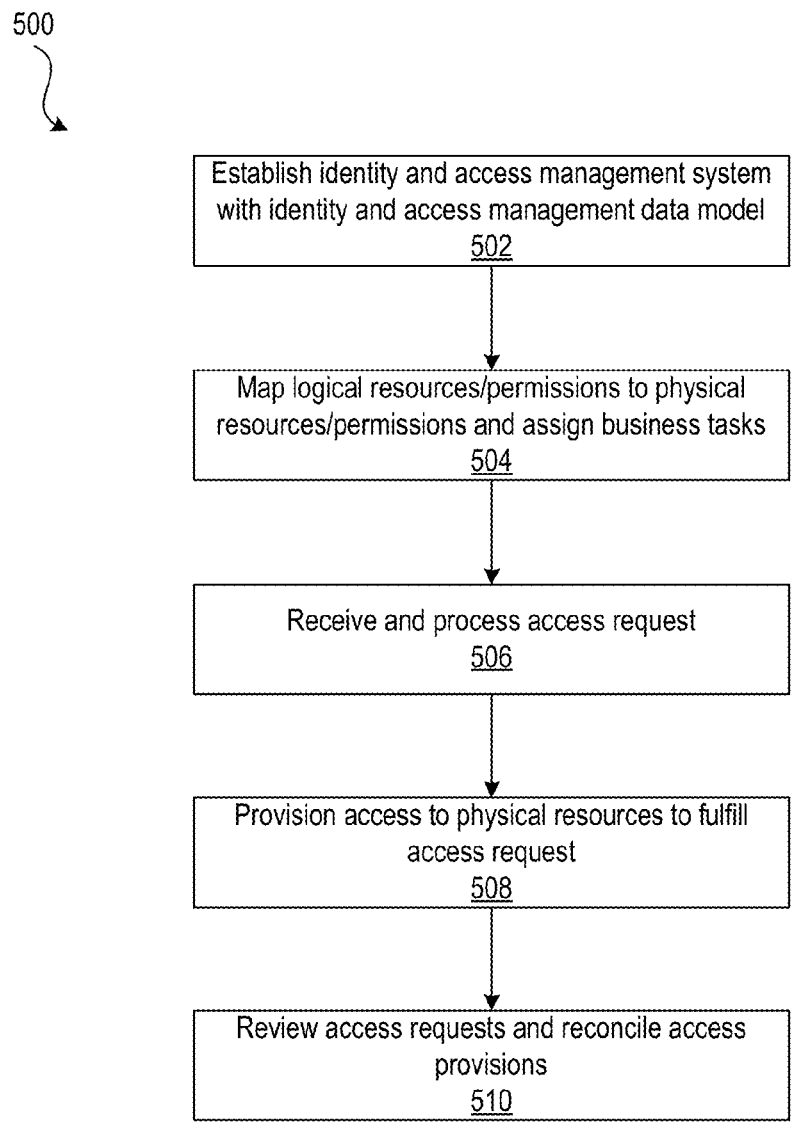
FIG. 5 is a flowchart of example method steps for processing an access request using an IAM system that implements an IAM data model.

FIG. 5 is a flowchart 500 of example method steps for processing an access request using an IAM system that implements an IAM data model. The example steps in FIG. 5 provide a general overview of the process an enterprise might perform to implement an IAM system for submitting access requests and conducting access reviews. As seen in FIG. 5, an enterprise may establish an IAM system having the various computing resources described above and may implement an IAM data model at a data store of the IAM system (block 502). The enterprise may then identify the logical and physical resources and permissions of the enterprise and may map the logical resources and permissions to the physical resources and permissions (block 504). Having established the IAM system and identified the resources and permissions, the IAM system may receive and process access requests (block 506). The IAM system may fulfill the access request, e.g., by provisioning access rights to the physical resources associated with a logical resource specified in the access request (block 508). The IAM system may then reconcile access rights as provisioned with access rights as specified, and business managers may conduct access reviews of access rights (block 510). As described above, the business managers may advantageously conduct the access reviews in business terms without regard to the physical implementation of the access rights at the various physical resources. These steps will be discussed in further detail below with reference to FIGS. 6-12.

Figure 6:
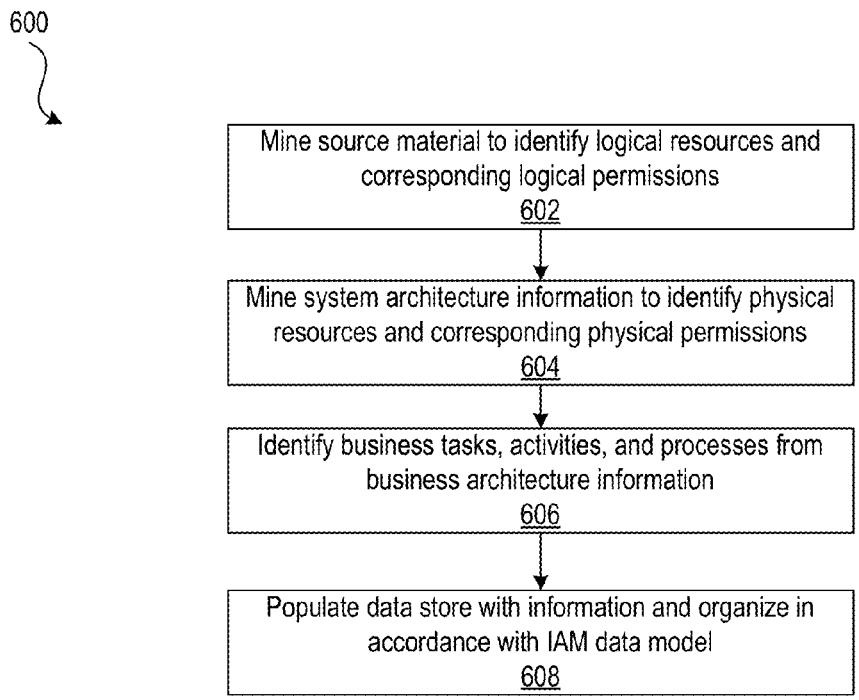
FIG. 6 is a flowchart of example method steps for establishing an IAM system having an IAM data model.

FIG. 6 is a flowchart 600 of example method steps for establishing an IAM system having an IAM data model. The steps in FIG. 6 may represent part of a preparation stage for implementing the IAM system. During the preparation stage, an enterprise may collect and organize the information used to populate the IAM data model. As seen in FIG. 6, an enterprise may mine various source materials to identify logical resources and logical permissions (block 602). Source materials may include, e.g., job aids, training materials, procedure manuals, and other types of source materials describing the architecture, polices, procedures, and duties of the enterprise. Business managers of the enterprise may, in some circumstances, assist in the identification of the logical resources and permissions. In a similar fashion, the enterprise may mine information describing the computer system architecture and its underlying infrastructure to identify the physical resources and physical permissions of the enterprise. IT personnel of the enterprise may, in some circumstances, assist in the identification of the physical resources and permissions. Finally, the enterprise may construct or model the business architecture to identify the various business tasks, activities, processes, roles, and units of the enterprise and define various job functions. Business modelers may, in some circumstances, assist in the modeling of the business architecture. The information gathered during this part of the preparation stage may be stored in the data store of the IAM system and organized in accordance with the IAM data model (block 608).

Figure 7:
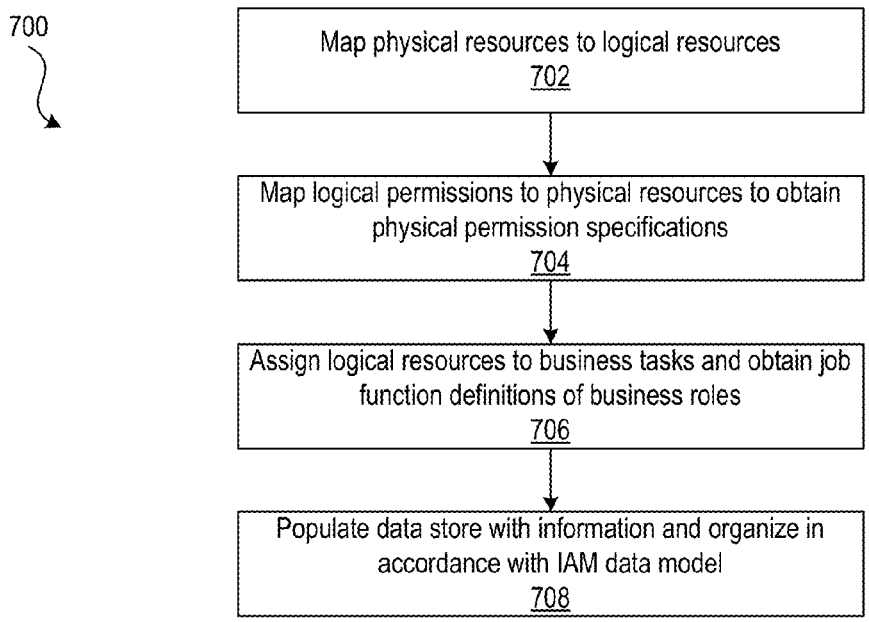
FIG. 7 is a flowchart of example method steps for mapping logical resources to physical resources and assigning logical resources to business tasks.

FIG. 7 is a flowchart 700 of example method steps for mapping logical resources to physical resources and assigning logical resources to business tasks. The steps in FIG. 7 may also represent a part of the preparation stage for implementing the IAM system. Having identified the logical resources and physicals resources, a resource mapper may map the logical resources to one or more physical resources (block 702) as described above. The resource mapper may also map the logical permissions associated with the logical resources to the physical resources in order to obtain physical permission specifications (block 704) as also described above. The resource assigner may utilize the logical resources and permissions to assign logical resources to business tasks, which may provide job function definitions for the business roles (block 706). This information, including the mapping and assignment information, may also be stored in the data store of the IAM system and organized in accordance with the IAM data model (block 708). It will be appreciated that the preparation stage for implementing an IAM system and corresponding IAM data model may include in addition to or as an alternative to those provided by way of example in FIGS. 6-7.

Figure 8:
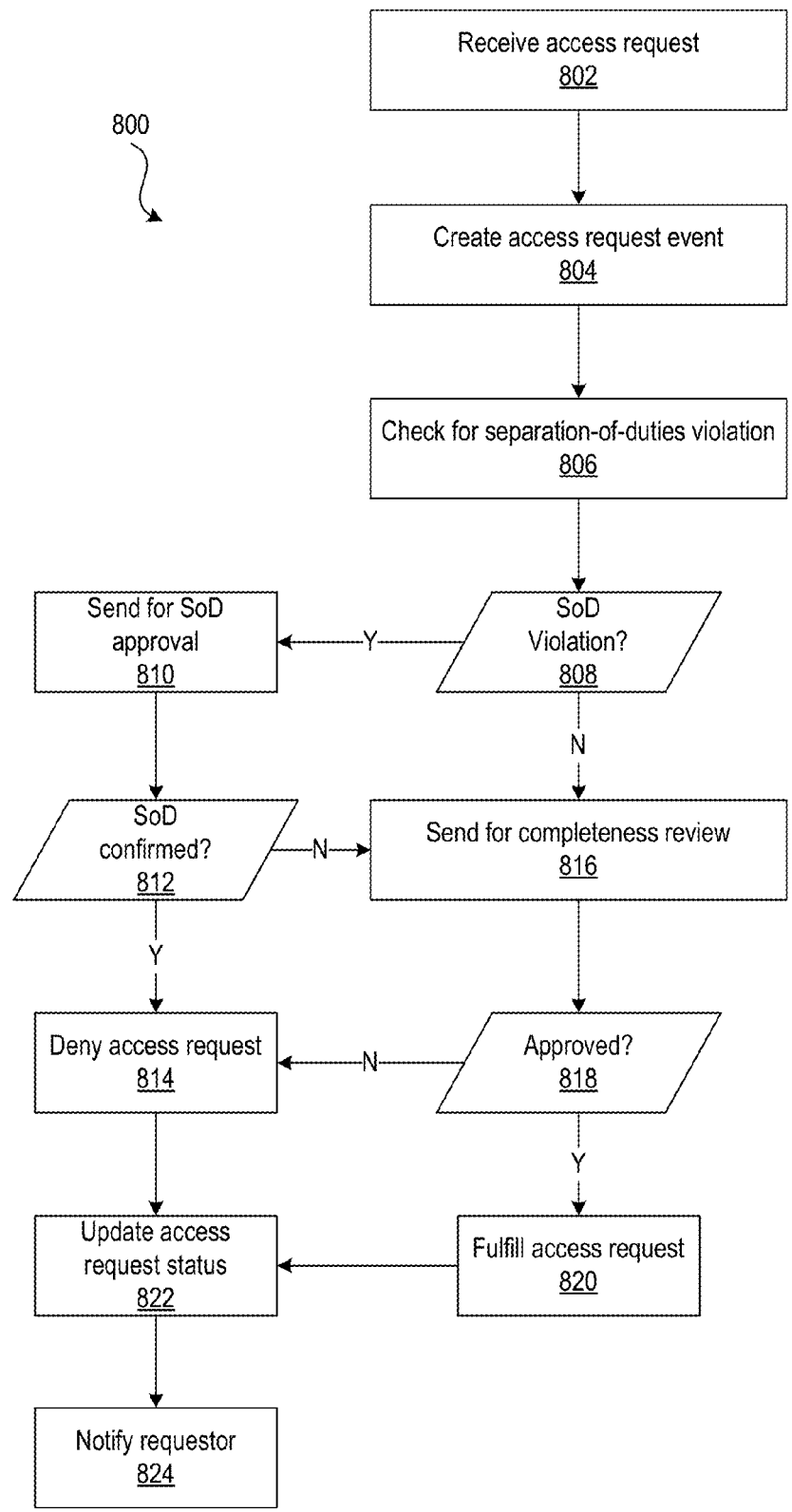
FIG. 8 is a flowchart of example method steps for processing an access request.

FIG. 8 is a flowchart 800 of example method steps for processing an access request. As described above, an access request handler may receive an access request (block 802) and create an access request event record for the access request received (block 804). As noted above, the status of the access request event may be updated throughout the lifecycle of the access request. When an access request is first received, the status of the corresponding access request event may be set to, e.g., "received." As also noted above, a separation-of-duties (SoD) verifier may analyze an access request for any potential SoD violations that would result if the requested access rights were provisioned. Accordingly, the access request handler may submit the access request to an SoD verifier to check for possible SoD violations (block 806).

In some circumstances, an access request may require approval before the IAM system provisions the requested access rights. In particular, an access request that is flagged as a potential SoD violation (block 808:Y) may be sent to a reviewer for approval (block 810). If the reviewer confirms the potential SoD violation (block 812:Y), then the access request may be denied (block 814). If, however, the reviewer clears the potential SoD violation, the reviewer may dismiss the SoD violation (block 812:N) and the access request may be further reviewed, e.g., for completeness. It will be appreciated that an access request may be reviewed for completeness even if the access request does not represent a potential SoD violation (block 808:N).

The access request handler may send the access request to a reviewer for a completeness review (block 816). The access request handler may update the status of the corresponding access request event to, e.g., "under review" while the reviewer conducts the review. The IAM system may also provide various interfaces (e.g., web portals or dashboards) that permit a requestor to view the status of submitted access requests and that permit reviewers to review access requests. Moreover, the IAM system may be configured to notify requestors upon changes to the access request status and to notify reviewers of new access requests to review. The IAM system may also notify requestees when new access rights are provisioned. The IAM system may provide these notifications, e.g., via email or via messages in an issue tracking system.

If a reviewer does not approve an access request (block 818:N), then the access request may be denied (block 814). If the reviewer approves the access request (block 818:Y), however, then the IAM system may fulfill the access request by provisioning the requested access rights to the requestee specified in the access request (block 820). In some example implementations, the IAM system may require approval from two reviewers before fulfilling the access request. Accordingly, steps 816-818 may be repeated for a second reviewer. A reviewer may not approve the access request where, for example, the access request is missing information or is otherwise incomplete.

Whether or not an access request is approved (block 818:Y) or denied (block 814), the IAM system updates the status of the access request (block 822). The IAM system may also notify the requestor of the status of the access request (block 824). When an access request is approved, for example, the IAM system may set the status of the access request event to "approved" and notify the requestor of the approval. If the access request is denied, however, the IAM system may set the status of the access request event to "denied" and likewise notify the requestor. When the IAM system denies an access request, the IAM system may indicate the reason for the denial, e.g., the access request may be incomplete or represent an SoD violation. The requestor may thus have the opportunity to revise the access request, e.g., by providing the missing information or specifying a different resource. The requestor may then resubmit the access request for approval and fulfillment.

Figure 9:
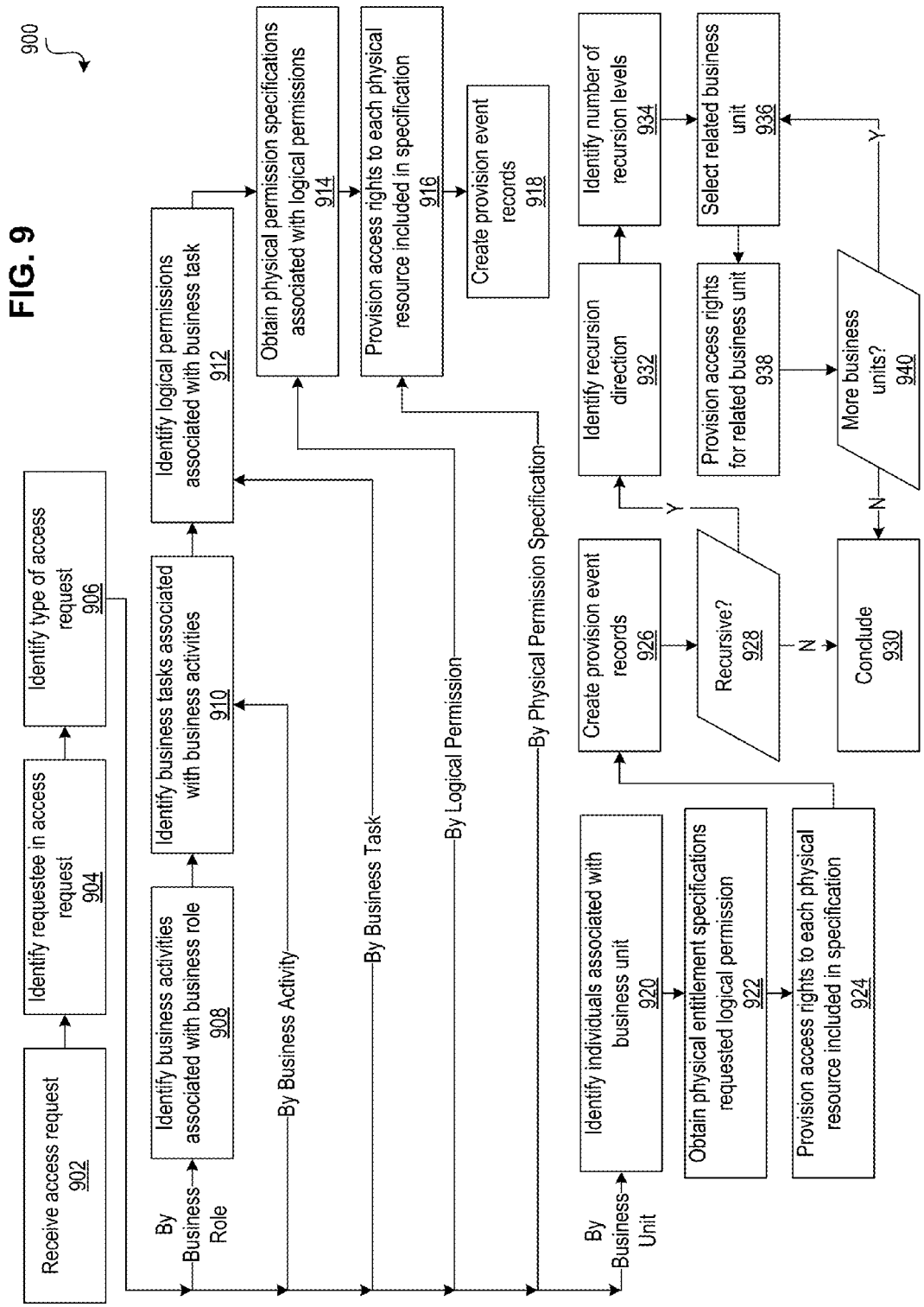
FIG. 9 is a flowchart of example method steps for fulfilling an access request.

FIG. 9 is a flowchart 900 of example method steps for fulfilling an access request. As noted above, an access request may be one of various types of access requests. Changes to access rights may be requested, e.g., by specifying a business task, by specifying a business activity, by specifying a business role, or by specifying a business unit. Stated differently, access rights may be provisioned for users by associating the user with a particular business task, business activity, business role, business unit, or other entities related to the business architecture of the enterprise. In physical terms, a user account may be associated with one or more user account groups that represent a business activity, business process, business role, or business unit. Changes to access rights may also be requested at a relatively lower level by specifying, e.g., a particular logical permission or a particular physical permission specification.

As seen in FIG. 9, an IAM system may be configured to adjust access rights in response to receipt of an access request (block 902). As noted above, the access request may indicate the requestee and the access request type. Accordingly, an access request handler of an IAM system may identify the requestee in the access request (block 904) as well as the access request type (block 906). The example method steps of the flowchart 900 in FIG. 9 illustrate the example method steps of processing an access request specifying various example access request types.

In some situations, an individual may be assigned a new business role and need access to the logical resources associated with that business role. In the physical context, assigning an individual to a business role may be implemented by adding the user account for the individual to the user account group corresponding to the business role. As a concrete example, a newly hired individual to the enterprise may be assigned to a basic employee role associated with basic resources such as email and timekeeping resources. The IAM system may thus provision access rights to the corresponding physical resources associated with the basic employee role (e.g., the email application, the email server, and the timekeeping application). The individual may then be assigned to a specific business role, e.g., an entry-level role. The entry-level role may be associated with various business activities such as opening, maintaining, and closing customer accounts; processing withdrawals and deposits; and other teller-related activities. Accordingly, the IAM system may provision access rights to the physical resources associated with teller role. As the individual is promoted through the organization, the individual may be assigned to additional roles such as senior-level roles and be provisioned with access rights to the physical resources associated with such senior-level roles. It will thus be appreciated that an individual may, in some circumstances, be associated with multiple roles (e.g., an entry-level role as well as a senior-level role) whereby resources and permissions may overlap. Accordingly, access rights may be provisioned based on the respective business activities and business tasks associated with business roles. It will also be appreciated that, in other situations, individual business activities and individual business tasks may be assigned to an individual of an enterprise without changing the business role the individual is assigned to.

If the access request specifies, for example, a business role (block 906:By Business Role), then the access request handler of the IAM system may identify the set of business activities associated with the business role (block 908). For each business activity in the set of business activities, the access request handler may identify the respective sets of business tasks associated with the business activities (block 910). In a similar fashion, the access request handler may identify the set of logical permissions associated with each of the business tasks (block 912). In turn, the access request handler may obtain the physical permission specifications for each of the logical permissions (block 914). In order to obtain the physical permission specifications, the access request handler may first derive the logical entitlements based on the logical permissions as described above. The access request handler may provide the logical entitlements to entitlement translator, which generates the physical entitlement specification based on the logical entitlements and the physical permission specifications as also described above. The entitlement translator may then provide the physical entitlement specifications to the access control manager, which contacts the various resource managers of the physical resources identified in the physical entitlement specifications. The resource managers may thus provision access rights to the physical resources in accordance with the physical entitlement specification (block 916). As noted above, provisioning event records may be created as access rights are provisioned (block 918). In this way, provisioned access rights may be traced back to requested access rights during the reconciliation process.

If the access request alternatively specifies a business activity (block 906:By Business Activity), then steps 910-918 may be performed to provision access rights to the physical resources associated with the business activities. Physical resources associated with business activities may be identified through the relationships of business tasks, logical permissions, and logical resources provided by the IAM data model. If the access request specifies a business task (block 906:By Business Task), then steps 912-918 may be performed to provision access to the physical resources associated with the business tasks. Physical resources may likewise be associated with business tasks through the relationships of logical permissions and logical resources provided by the IAM data model.

As also noted above, an access request may specify a particular logical permission to provision for a requestee (block 906:By Logical Permission). In this circumstance, steps 914-918 may be performed to provision access to the physical resources associated with the logical permission. As noted above, an access request may specify a particular physical permission specification (block 906:By Physical Permission specification). In this other circumstance, steps 916-918 may be performed to provision access rights to the physical resources indicated in the physical permission specification.

Moreover, an access request may specify a resource and a business unit (block 906:By Business Unit). A business unit also be referred to as an organization that includes a collection of individuals. Additionally, an organization may be associated with other organizations thereby allowing for a hierarchical structuring of business units. An enterprise may prefer to have each individual of a business unit have the same logical permissions. Accordingly, the IAM system may provision access rights for each logical permission associated with a business unit when a new individual is assigned to the business unit. The IAM system may also provision access rights for each individual associated with a business unit when a new logical permission is assigned to the business unit. Furthermore, the IAM system may recursively identify logical permissions or individual associated with other organizations of the business unit hierarchy and provision access rights to those related business units.

In FIG. 9, the access request handler, in this example, may identify the individuals associated with the business unit specified in the access request (block 920). Using the access request handler and entitlement translator, the physical entitlement specification for the requested logical permission may be obtained (block 922) as described above. The access control manager may contact the various resource managers of the physical resources to provision the access rights to those resources in accordance with the physical entitlement specifications (block 924). Provisioning records may be created for each access right provisioned (block 926).

As noted above, a business unit may be associated with another business unit in a hierarchical structure. Accordingly, the IAM system may recursively provision access rights for other business units hierarchically above or below the specified business unit. The access request may specify whether the access request should be recursively applied to related business units. If the access request does not specify recursive provisioning of access rights (block 928:N), then the access request handler may conclude the provisioning process (block 930).

If, however, the access request does specify recursive provisioning of access rights to related business units (block 928:Y), then the access request handler may identify the direction to proceed through the hierarchy (block 932), e.g., up or down from the current business unit as well as the distance from the current business unit, e.g., the number of recursion levels (block 934). The access request may indicate the direction and number of levels for recursively provisioning access rights. Having provisioned access rights for the current business unit, the access request handler may next select a related business unit based on the recursion direction and recursion level (block 936) and provision access rights for the related business unit (block 938) as described above. For example, steps 920-926 may be repeated to provision the access rights for the related business unit. If there are more related business units to provision access rights for, (block 940:Y), then steps 936-938 may be repeated to provision access rights for those additional related business units. Otherwise the access manager may conclude the provision process (block 930) if there are no more business units to provision (block 940:N).

Figure 10:
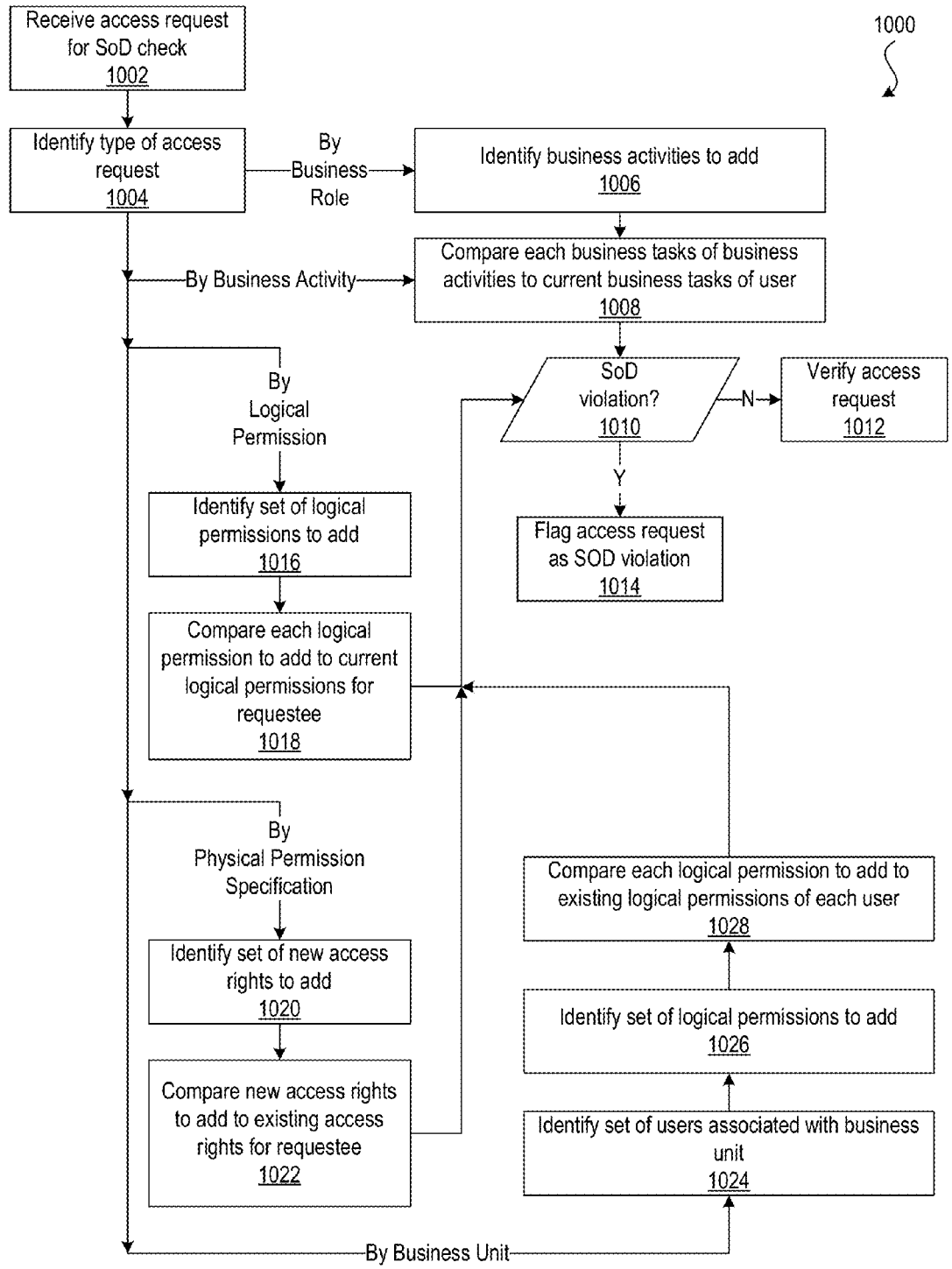
FIG. 10 is a flowchart of example method steps for identifying a separation-of-duties violation associated with an access request.

FIG. 10 is a flowchart 1000 of example method steps for identifying a potential separation-of-duties (SoD) violation associated with an access request. As described above, an SoD violation may occur when a user is associated with incompatible business tasks. Business tasks may be incompatible when the business tasks should not be performed by the same individual. If two business tasks are incompatible, then the logical permissions associated with those business tasks may also be incompatible. The IAM data model may include elements for modeling incompatible business tasks by, e.g., creating a relationship between business tasks that are incompatible. Examples of incompatible business tasks will be appreciated for the various contexts in which aspects of the disclosure may be implemented.

Separation-of-duty violations may be checked at various levels of the business architecture. For example, SoD violations may be checked for business roles, business activities, business tasks, logical permissions, logical entitlements, physical permissions, physical entitlements, and for other IAM-related aspects. In FIG. 10, example method steps of checking for potential SoD violations involving various type of access requests is shown. The SoD verifier of an IAM system may receive an access request (block 1002) and identify the type of access request (block 1004). The SoD verifier may identify a potential SoD violation if the requested logical permission is incompatible with an existing logical permission of a user. Through the relationship of logical permissions to business tasks, the SoD verifier may identify incompatible business tasks and a potential SoD violation. The SoD verifier may also identify potential SoD violations for incompatible business activities, business processes, business roles, and business units in a similar fashion. If a new business activity to add to a user includes a business task that is incompatible with a current business task of a current business activity for the user, then the SoD verifier may identify a potential SoD violation between the new and current business activities. Current business tasks and current business activities may also be respectively referred to as existing business tasks and existing business activities. It will be appreciated that the SoD verifier may identify incompatible business roles and business processes in a similar fashion where a new business role or new business to add includes a business activity that includes a business task that is incompatible with a current business task of the user.

Accordingly, if the access request specifies a new business role to add to a user (block 1004:By Business Role), the SoD verifier may identify the business activities associated with the new business role (block 1006). The SoD verifier may then compare each business activity of the new business role to the existing business activities associated with the user (block 1008). If the SoD verifier determines that one of the new business activities do not include business tasks that are incompatible with the current business tasks associated with the user, then the SoD verifier may determine a potential SoD violation would not result (block 1010:N). The SoD verifier may therefore verify the access request (block 1012) so that access rights may be provisioned for the user. If, however, the SoD verifier determines that one of the new business activities to add includes a business task that is incompatible with a current business task of the user (1010: Y), then the SoD verifier may flag the access request as a potential SoD violation (block 1014). If the access request specifies a new business activity to add to the user (block 1004:By Business Activity), then the SoD verifier may compare the business tasks of the new business activity to the current business tasks associated with the user (block 1008) as described above. With the benefit of FIG. 10, it will be appreciated that step 1008 may be performed to determine whether an access request specifying a business task represents a potential SoD violation with respect to current business tasks associated with the user. In this example, if the specified business task is incompatible with a current business task of the user, then the SoD verifier may determine that the access request represents a potential SoD violation (block 1010:Y) and flag the access request (block 1014).

If the access request specifies a logical permission to add to the user (block 1004:By Logical Permission), then the SoD verifier may carry out similar steps to determine whether an SoD violation would result if the new logical permission were provisioned for the user. As shown by way of example in FIG. 10, the SoD verifier may identify a set of logical permissions to add to the user based on the access request (block 1016). The SoD verifier may then compare each logical permission to add to the existing logical permissions for the user (block 1018). If a new logical permission to add is associated with a business task that is incompatible with a current business task of the user, then the SoD verifier may identify an SoD violation for the access request (block 1010:Y) and flag the access request as a potential SoD violation (block 1014). In a similar fashion, the SoD verifier may check the access request when the access request specifies a new physical permission specification to add to the user (block 1004:By Physical Permission Specification). The SoD verifier may identify a set of new access rights to add to the user (block 1020) based on the physical permission specification specified by the access request. The SoD verifier may then compare each physical new access right to add to the existing access rights for the user (block 1022). Through the relationship between physical permissions and logical permissions in the IAM data model, the SoD verifier may identify the current business tasks associated with the user. If at least one of the new access rights to add is associated with a business task that is incompatible with an current business task of the user, then the SoD verifier may identify an SoD violation for the access request (block 1010:Y) and flag the access request as a potential SoD violation (block 1014).

As also shown by way of example in FIG. 10, the access request may specify a business unit (block 1004:By Business Unit). The SoD verifier may identify a set of users associated with the business unit (block 1024) as well as a set of logical permissions to add to the users of the business unit (block 1026). The SoD verifier may identify incompatible logical permissions through the relationship between business tasks and logical permissions as described above. If at least one of the logical permissions to add is associated with a business task that is incompatible with at least one of the current business tasks of the users of the business unit, then the SoD verifier, in this example, may identify an SoD violation for the access request (block 1010:Y) and flag the access request as a potential SoD violation (block 1014).

Figure 11:
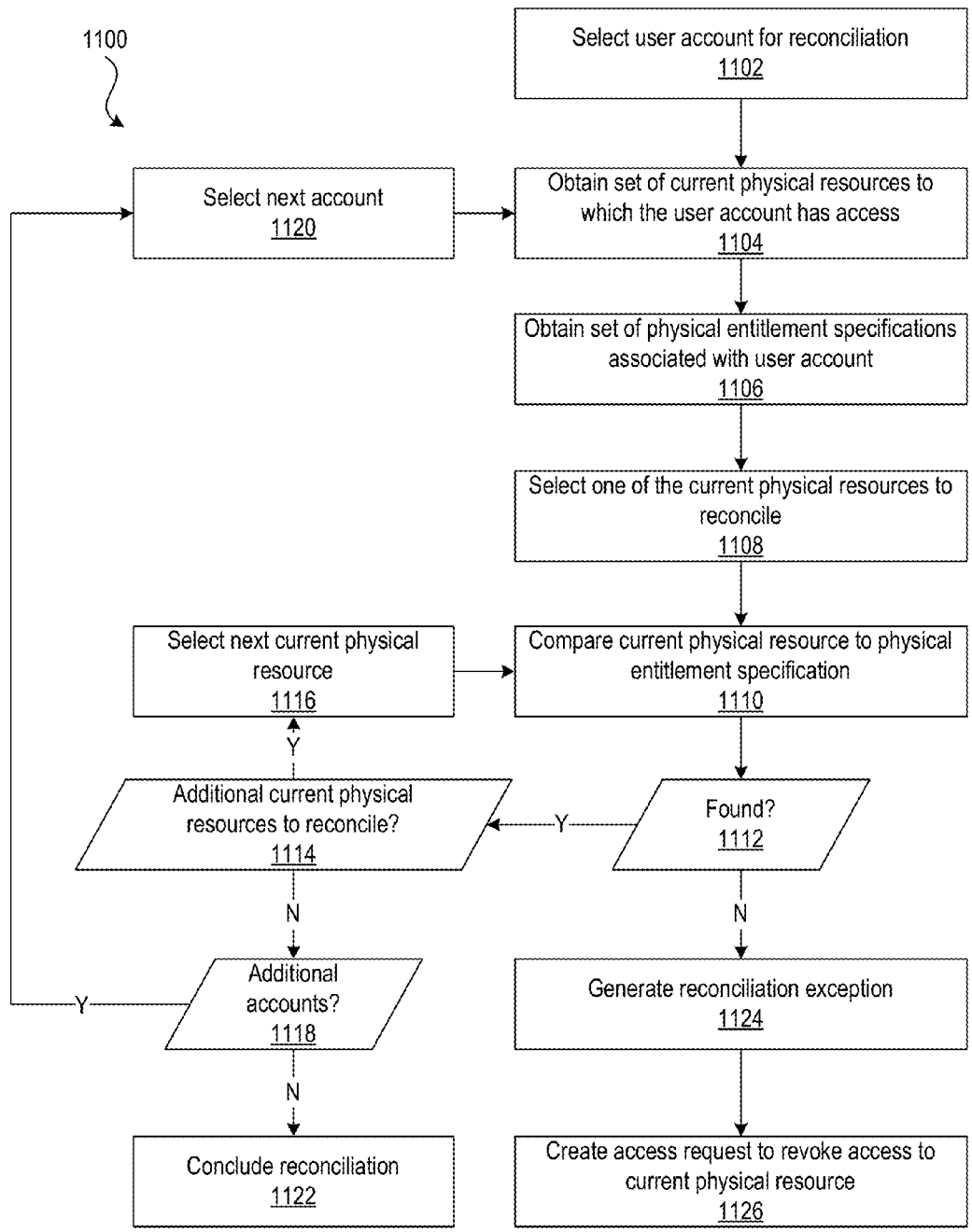
FIG. 11 is a flowchart of example method steps for reconciling access rights as requested with access rights as provisioned.

Once access rights have been provisioned for a user account, the reconciler of the IAM system may reconcile the access rights for the user account. FIG. 11 is a flowchart 1100 of example method steps for reconciling access rights as requested with access rights as provisioned. The reconciler may select a user account for reconciliation (block 1102). The reconciler may then obtain a set of current physical resources to which the user account has access (block 1104). The provisioned physical entitlements (324 in FIGS. 3-4) may represent the set of current physical resources accessible by the user account. The reconciler may also obtain the set of physical entitlement specifications associated with the user account (block 1106). The set of physical entitlement specifications may represent the access rights as specified for the user account. Using the set of current physical resources accessible to the user account, the reconciler may thus compare access rights as implemented to access rights as requested and specified.

The reconciler may select one of the current physical resources to reconcile (block 1108) and compare the selected current physical resource to the set of physical entitlement specifications associated with the user account (block 1110). The reconciler may, for example, compare the current physical resource to each physical entitlement specification in the set of physical entitlement specifications. If the selected current physical resource is found in at least one of the physical entitlement specifications (block 1112:Y), then the access rights as provisioned for the current physical resource is traceable back to an access request through the related entities of the IAM data model. In particular, the physical entitlement specification that indicates the current physical resource may be traced through the IAM data model to a logical entitlement and thus to an access request. The reconciler may therefore determine that the user account is authorized to access the current physical resource undergoing reconciliation and move on to the next physical entitlement implementation.

If there are additional current physical resources to reconcile for the user account (block 1114:Y), then the reconciler may select the next current physical resource (block 1116) and repeat steps 1110-1112 to reconcile the next selected current physical resource. If there are no additional current physical resources to reconcile for the user account (block 1114:N), then the reconciler may reconcile current physical resources accessible by additional user accounts. If there are additional user accounts to reconcile (block 1118:Y), then the reconciler may select the next user account (block 1120) and repeat steps 1104-1116 to reconcile the current physical resources accessible by the next selected user account. If there are no additional user accounts to reconcile (block 1118:N), however, then the reconciler may conclude the reconciliation process (block 1122).

If the reconciler cannot locate a physical entitlement specification that specifies the current physical resource (block 1112:N), however, then the reconciler may determine that the current physical resource accessible to the user account cannot be traced back to an access request and generate a reconciliation exception (block 1124). In response to the reconciliation exception, the reconciler may notify (e.g., via email) an individual such as a manager that a user has been provisioned access rights to a physical resource that cannot be traced back to an access request. In other example implementations, the reconciler may automatically create an access request to revoke access rights to the current physical resource that cannot be traced back to an access request (block 1126). In this way, the IAM system may advantageously automate various aspects of managing access rights to the physical computing resources of an enterprise.

Figure 12:
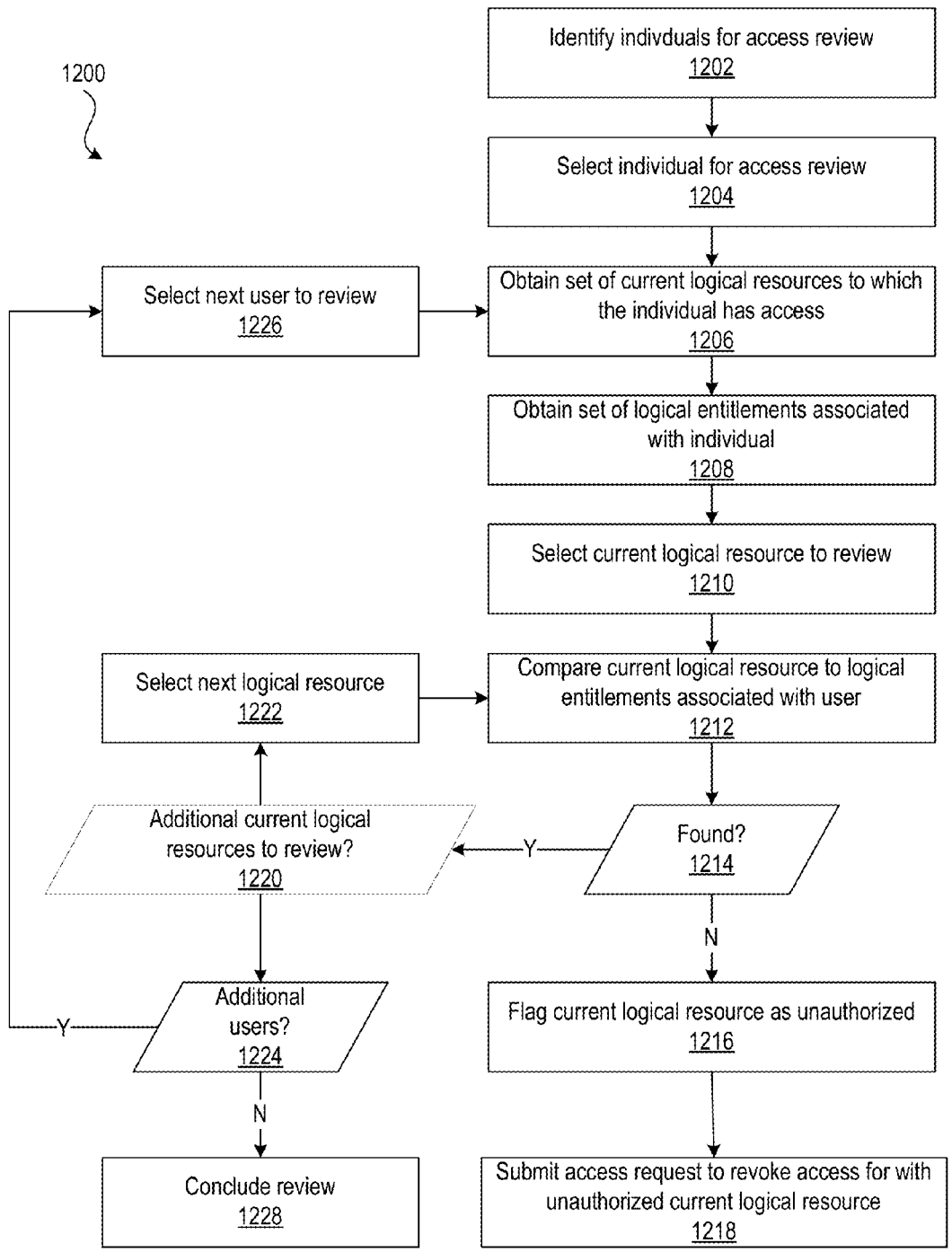
FIG. 12 is a flowchart of example method steps for conducting an access review.

FIG. 12 is a flowchart 1200 of example method steps for conducting an access review. Business managers may conduct access reviews for the individuals they manage. As described above, the IAM system and its IAM data model advantageously enable business managers to conduct access reviews in business terms based on the logical aspects of the enterprise computer system. By conducting access reviews in terms the business managers are familiar with, business managers may be more accurate when reviewing the access rights associated with a user.

As seen in FIG. 12, a business manager may identify a set of individuals (e.g., users) to perform access reviews for (block 1202). Through a web portal or dashboard, for example, the business manager may select one of the individuals to review (block 1204). The IAM system may obtain a set of current logical resources the individual has access to (block 1206). The IAM system may obtain the set of current logical resources accessible to the selected individual through the IAM data model that establishes relationships between physical resources and logical resources. The IAM system may also obtain the set of logical entitlements associated with the individual under review (block 1208). The IAM system may likewise obtain the set of the logical entitlements associated with the individual through the IAM data model. The business manager may then select for review one of the current logical resources accessible to the individual (block 1210). The business manager may, for example, compare the selected current logical resource to each logical entitlement in the set of logical entitlements (block 1212). If the current logical resource is found in one of the logical entitlements, then the current logical resource is traceable back to an access request associated with the logical entitlement through the relationship between access requests and logical entitlements provided by the IAM data model as described above.

If the business manager cannot locate the selected current logical resource in at least one of the logical entitlements (block 1214:N), then the business manager may determine the individual is not authorized to access the current logical resource and flag the current logical resource as unauthorized (block 1216). In response to determining the current logical resource accessible by the individual not authorized, the business manager may submit an access request to revoke the access rights associated with the current logical resource (block 1218). If, however, the business manager can locate the selected current logical resource in at least one of the logical entitlements (block 1216:Y), then the business manager may determine the individual is authorized to access the current logical resource and move on to the next current logical resource accessible to the individual. If there are additional logical resources to review (block 1220:Y), then the business manager may select the next logical resource accessible to the individual under review (block 1222) and repeat steps 1212-1214 to review the next selected logical resource.

If there are no additional logical resources to review for the individual (block 1220:N), then the business manager may move on to another individual to review. If there are additional individuals remain to review (block 1224:Y), then the business manager may select the next individual (block 1226) and repeat steps 1206-1222 for the next selected individuals. If the business manager has conducted an access review for all of the individuals under review (block 1224:N), then the business manager may conclude the access review (block 1228).

It will be appreciated that access reviews may also be utilized to identify logical resources that are not—but should be—accessible to an individual. A business manager may therefore also submit access requests to provision access rights for any logical resources that should be accessible to the individual. It will also be appreciated that the IAM system may automate various aspects of conducting access reviews including, e.g., obtaining the set of current logical resources and the set of logical entitlements for a user, comparing the current logical resources to the logical entitlements, and submitting access requests to add or remove access rights. Moreover, the IAM system may include a module (e.g., an access review module or access reviewer) to automatically conduct access reviews. In some example implementations, the reconciler may also function as an access reviewer to review and reconcile the logical computing resources a user has access to. The access reviewer (or reconciler) may also determine whether a current logical resource to which the user has access can be traced back to an access request through a logical entitlement as described above. The access review module (or reconciler) may provide a summary of the access review to the business manager.

The access review summary may indicate, e.g., the logical computing resources that have been requested for the user and the logical computing resources to which the user currently has access. The access review summary may be provided as an electronic document which can be printed in hardcopy or, additionally or alternatively, as an electronic display presented at an interface such as a web portal or dashboard. The access review summary may also indicate the current logical resources to which the user has access that cannot be traced back to an access request, in other words, current logical resources that are not indicated in any of the logical entitlements associated with the user. The access request summary may include information about the access request, e.g., the date the access request was submitted, the requestor, the requestee, the date the access request was approved, the individual that approved the access request (an approver), and other types of access request information. The access review summary may also indicate logical resources that were requested for the user but the user cannot access. The user may not be able to access the logical resource if the user has not been provisioned with access rights to one or more of the physical resources associated with the logical resource. A business manager or the access reviewer may thus submit access requests to adjust access to the logical resources based on the access review summary, e.g., to disable access to logical resources the user should not have access to or to enable access to logical resources the user should have access to.

Figure 13:
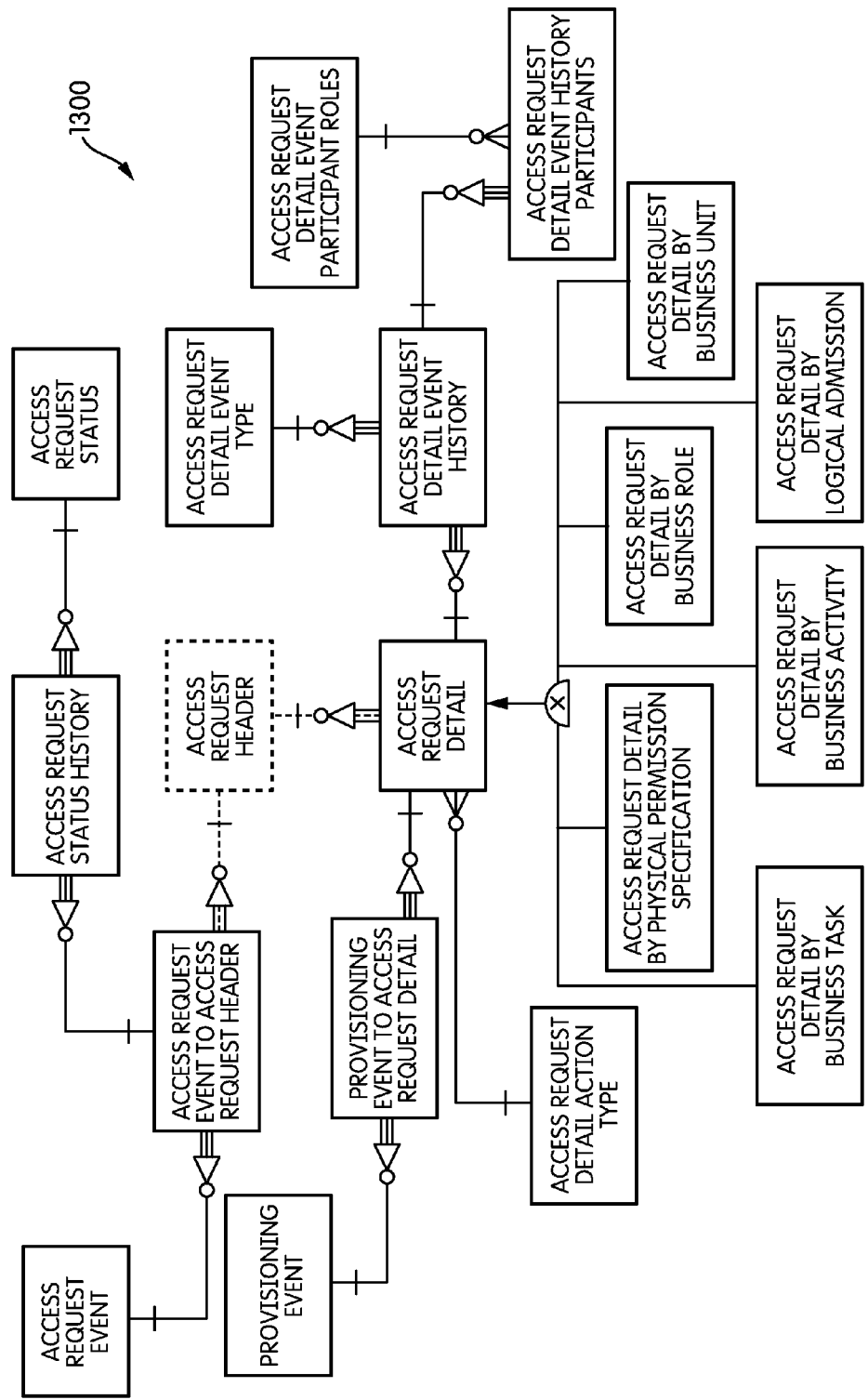
FIG. 13 is a portion of an example of an implementation of an IAM data model, the portion including elements relating to access requests.

Referring to FIGS. 13-18, various portions of an example of an implementation of an IAM data model configured to facilitate access requests and access reviews are shown. In FIG. 13, for example, a portion 1300 of an example IAM data model that relates to access request is shown. As seen in FIG. 13, this portion 1300 of the example IAM data model includes elements relating to an access request header, detail, type, and status. The portion 1300 of the example IAM data model in FIG. 13 also includes elements relating to an access request status history and an access request detail history. The portion 1300 of the IAM data model in FIG. 13 additionally includes elements relating to the participants associated with the access request and their corresponding roles. Access request events and provisioning events are also included in the portion 1300 of the IAM data model as shown by way of example in FIG. 13. Moreover, the portion 1300 of the example IAM data model in FIG. 13 illustrates the various types of access requests such as, e.g., access requests by business task, access request by physical permission specification, access request by business activity, access request by business detail, access request by logical permission, access request by business unit.

Figure 14:
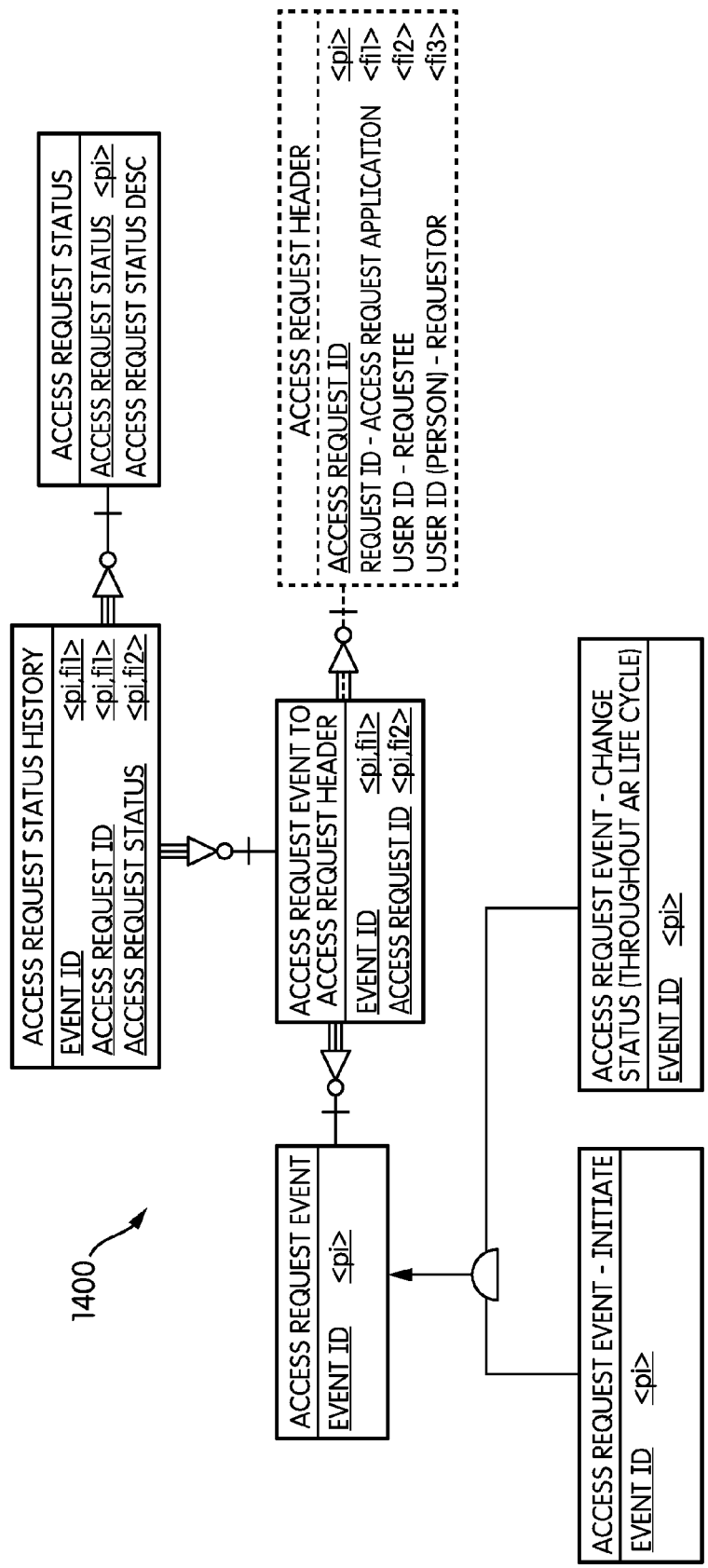
FIG. 14 is a portion of an example of an implementation of an IAM data model, the portion also including elements relating to access requests.
Figure 15:
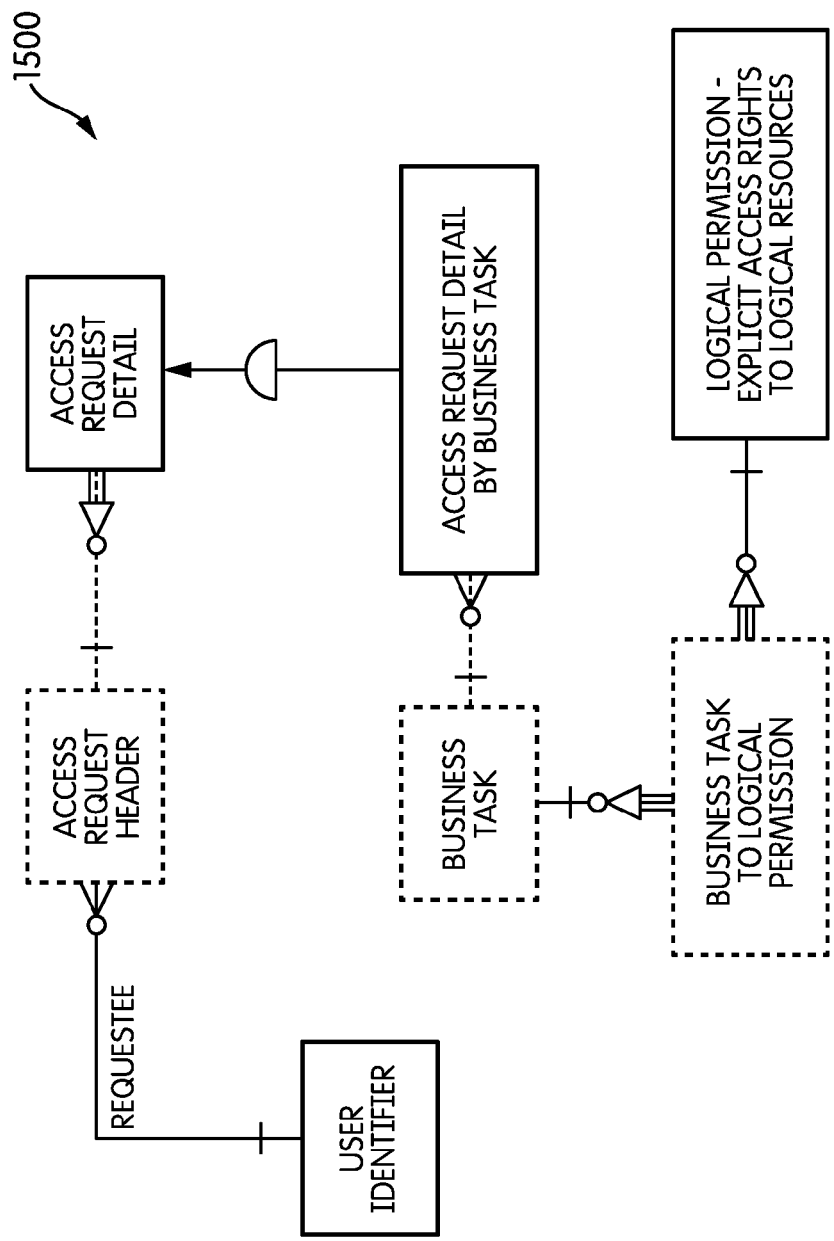
FIG. 15 is a portion of an example of an implementation of an IAM data model, the portion including elements relating to access requests by business task.

In FIG. 14, another portion 1400 of an example IAM data model is shown. In this portion 1400 of the IAM data model, various example details of the elements relating to access request headers, access request statuses, and access request events are shown. In FIG. 15, an additional portion 1500 of an example of an IAM data model is shown. This example IAM data model portion 1500 illustrates the relationships that establish associations a user, an access request by business task, a business task, and the logical permissions for the business task. It will be appreciated that example IAM data models may be similarly configured to establish associations between other types of access requests such as those identified above with reference to FIGS. 14-15.

Figure 16A:
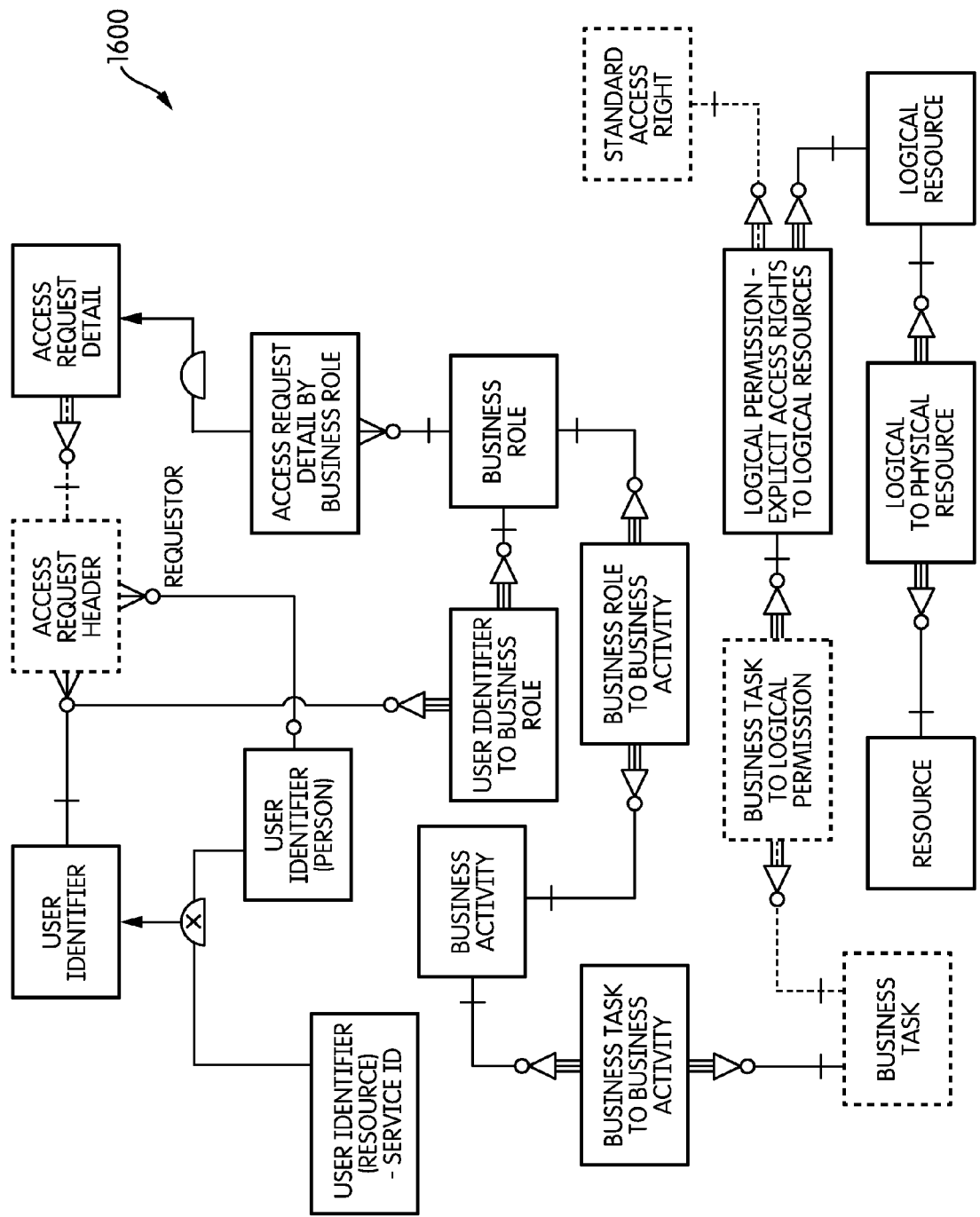
FIG. 16A is a portion of an example of an implementation of an IAM data model, the portion including elements relating to the logical aspects of access requests by business role.
Figures 1, 16B:
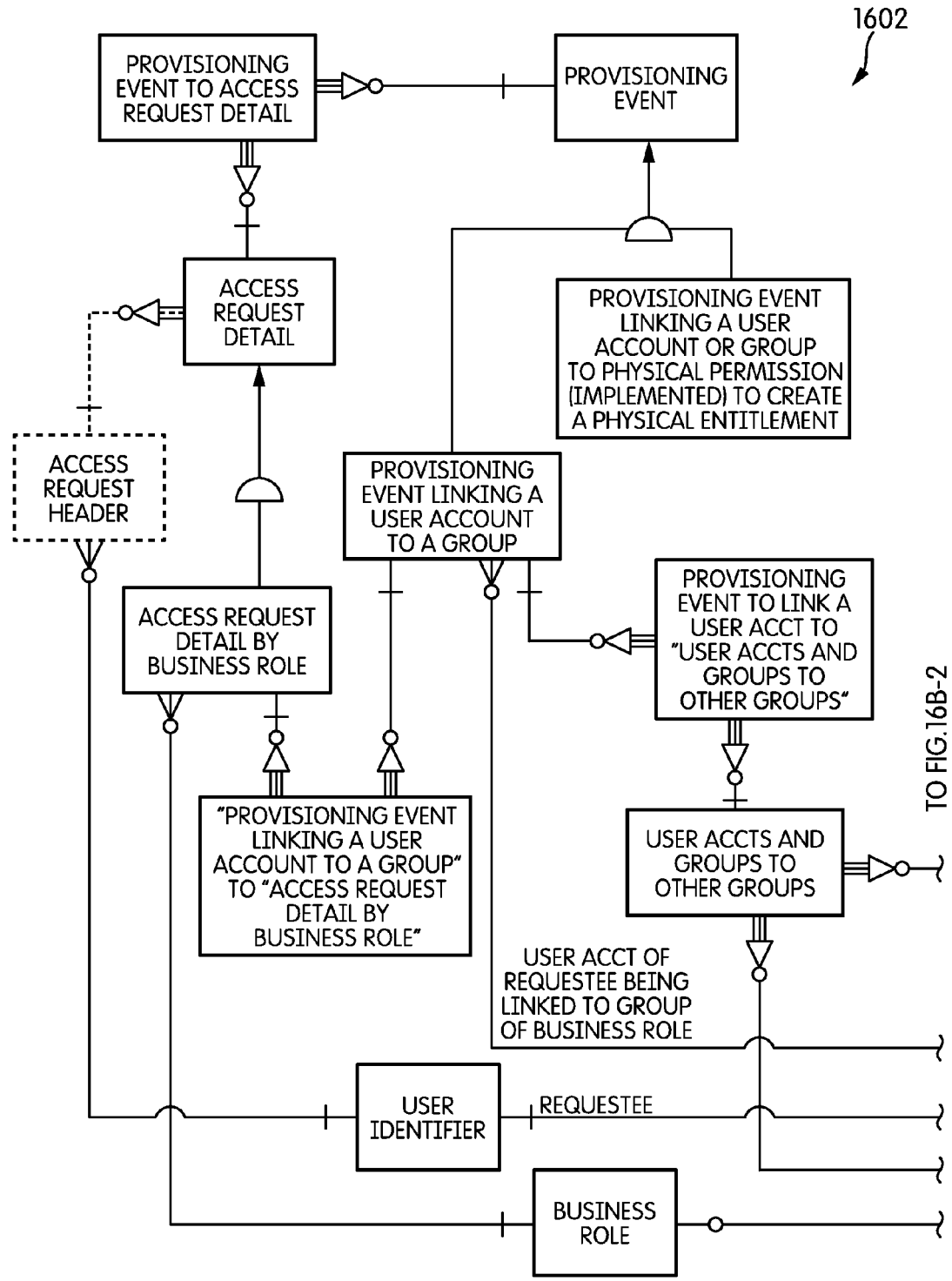
FIG. 16B is a portion of an example of an implementation of an IAM data model, the portion including elements relating to the physical aspects of access requests by business role.
Figures 2, 16B:
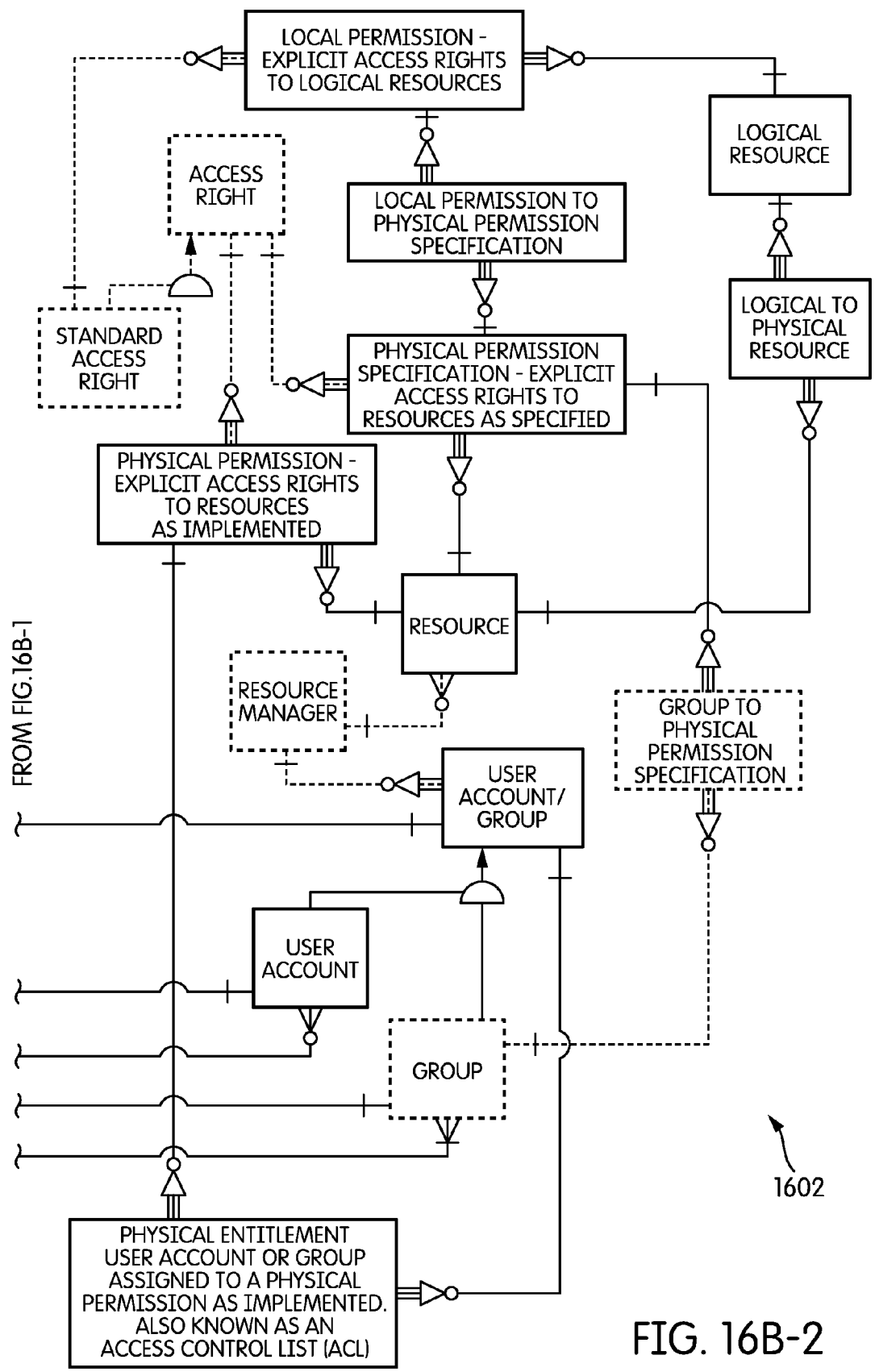

FIGS. 16A-B illustrate portions of an example IAM data model including elements respectively relating to the logical and physical aspects of access requests by business role. In particular FIG. 16A shows a portion 1600 of an example IAM data model, which includes the elements relating to the logical aspects of access requests by business role. As seen in FIG. 16, the portion 1600 of the example IAM data model illustrates the relationships that establish associations between users, access requests, business roles, business activities, business tasks, logical resources, logical permissions, and access rights. In a similar fashion, FIG. 16B shows a portion 1602 of the example IAM data model, which includes the elements relating to the physical aspects of access requests by business role. In particular, the IAM data model portion 1602 in FIG. 16B illustrates the relationships that establish associations between users, access requests, business roles, physical resources, physical permissions, physical entitlements, and provisioning events.

Figure 17:
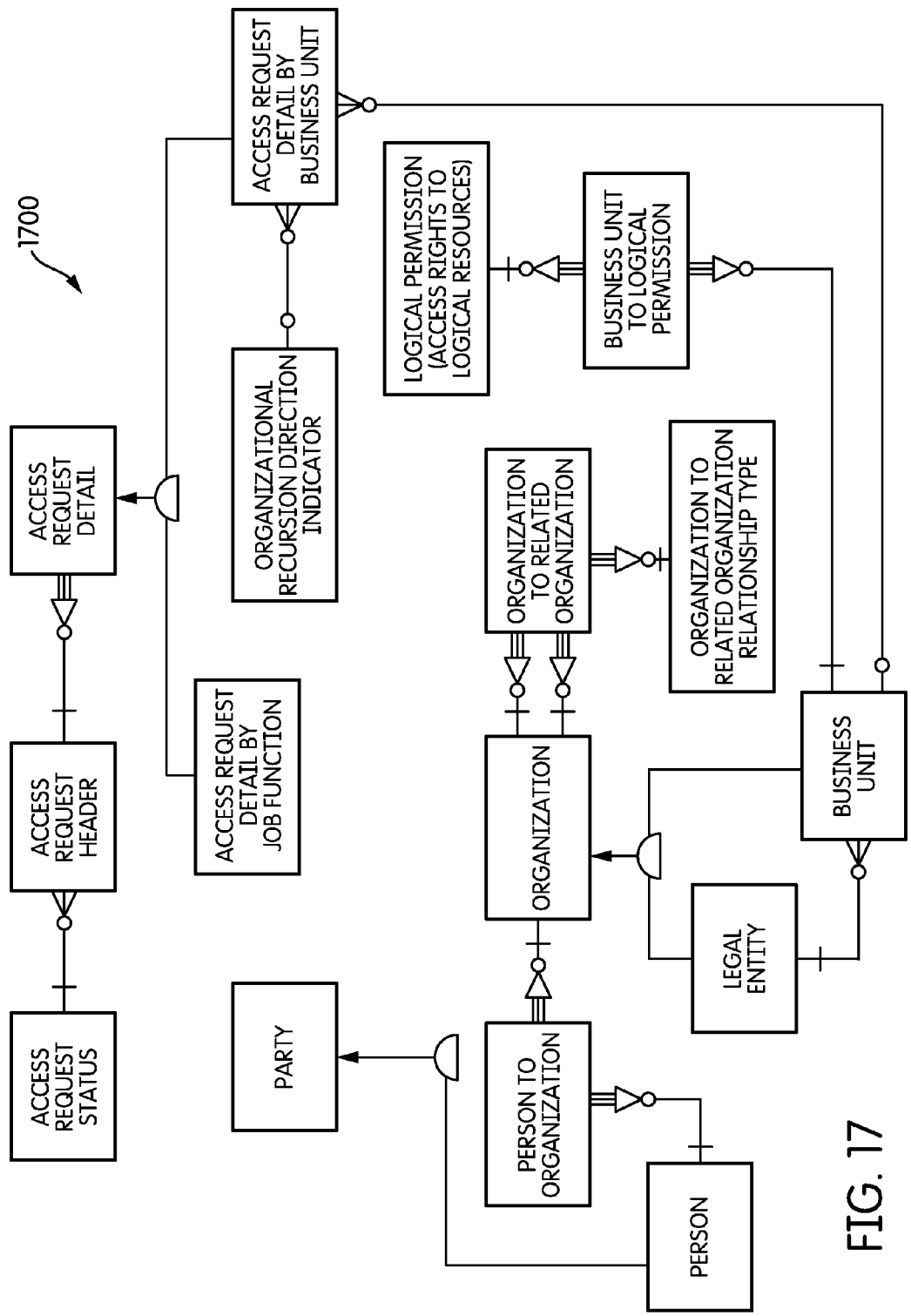
FIG. 17 is a portion of an example of an implementation of an IAM data model, the portion including elements relating to the logical aspects of access requests by business unit.

FIG. 17 illustrates the logical aspects of access requests by business unit. Business units may also be referred to as organizations. In FIG. 17, a portion 1700 of an example data model is shown, which illustrates the elements and relationships between business units (organizations), individuals or other parties of the business unit, and logical permissions for logical resources. As seen in FIG. 17, business units may be related to other business units, e.g., in a hierarchical fashion as described above.

Figure 18:
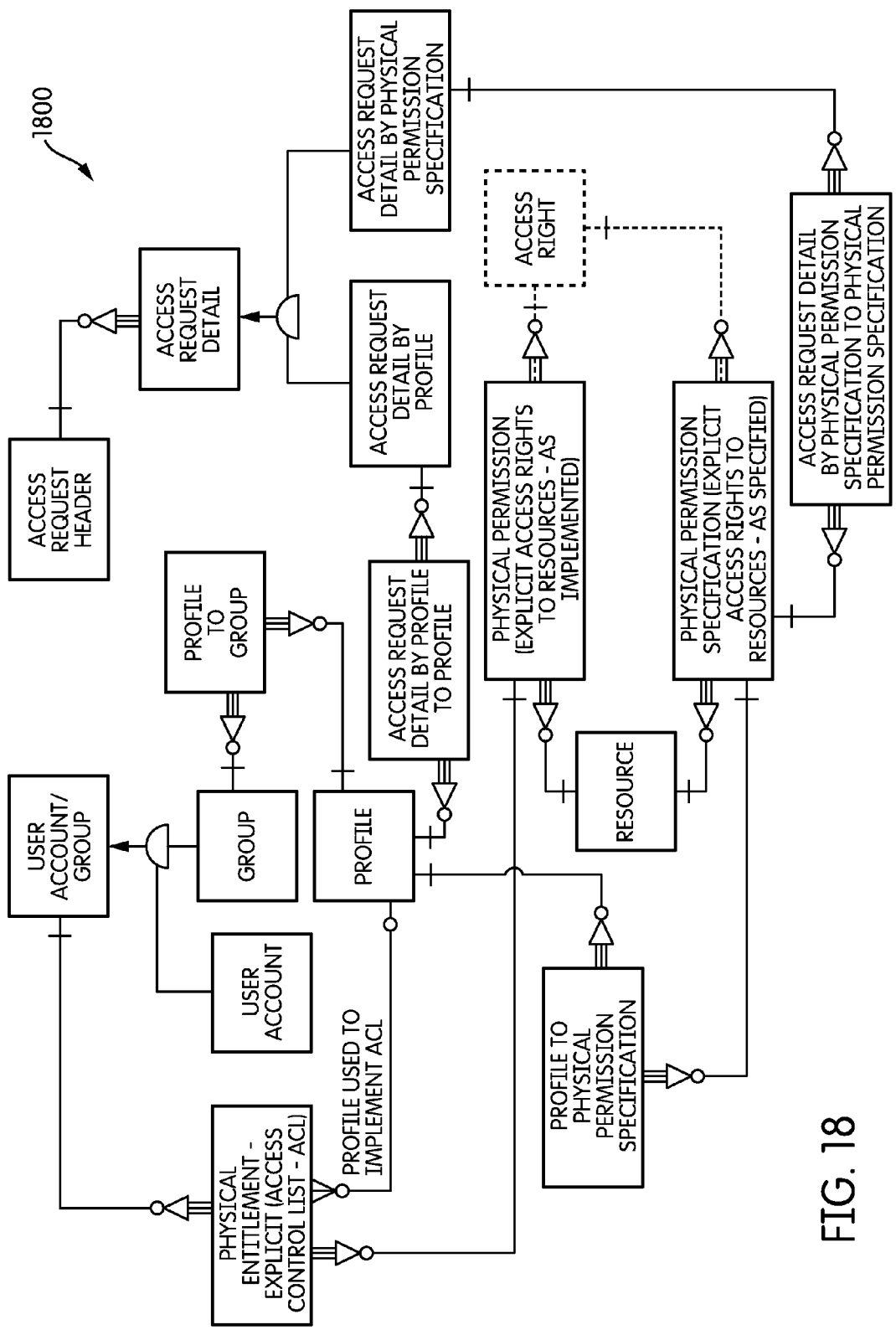
FIG. 18 is a portion of an example of an implementation of an IAM data model, the portion including elements relating to access requests by physical permission specification.

In FIG. 18, a portion 1800 of an example IAM data model in which elements relating to access requests by physical permission specification are shown. As seen in FIG. 16, the IAM data model portion 1800 illustrates the relationships that establish associations between users, access requests, physical permissions, physical permission specifications, and physical resources.

It will be appreciated that the portions 1300-1800 of IAM data models shown in FIGS. 13-18 are by way of example only. Additional or alternative implementations of an IAM data model having additional or alternative elements, attributes, or relationships may be selectively employed without departing from the scope of innovations described in the present disclosure. Such alternative implementations may likewise be utilized to fulfill access requests and conduct access reviews in an IAM system as described above.

The disclosures set forth above provide various technological innovations and advantages. First, the systems and methods described above allow business managers to submit access requests in business terms, which are translated into physical terms to provision access rights to physical computing resources. This reduces the possibility that the user account of an individual will be provisioned with access rights to physical computing resources that the individual should not have access to. In addition, the components of the IAM system automate aspects of the provisioning process to add, remove, or change access rights to physical computing resources. Furthermore, the IAM system may automatically reconcile access rights as provisioned and implemented with access rights as requested and specified. If the IAM system determines that a user account has been provisioned with access rights to a physical computing resource it should not have access to, then the IAM system may remedy the unauthorized access by automatically generating and submitting access request to revoke access to the physical computing resource. These and other technological advantages will be appreciated with the benefit of this disclosure.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A computer-implemented method of verifying separation-of-duties for requested access rights to physical computing resources comprising:
providing a database that implements an identity and access management (IAM) data model, the IAM data model defining a first relationship between a user entity and a business task entity and defining a second relationship between the business task entity and a logical permission entity;
storing, at the database, (a) a set of user records, each user record conforming to the user entity, (b) a set of business task records, each business task record conforming to the business task entity, and (c) a set of logical permission records, each logical permission record conforming to the logical permission entity;
receiving a request to provision one or more access rights for a user specified in the request;
identifying a business task to provision one or more access rights for based on content included in the request;
querying the database for a first logical permission record that is associated with a first business task record that is associated with a user record corresponding to the user specified in the request, the first business task record corresponding to a current business task associated with the user specified in the request;
querying the database for a second logical permission record that is associated with a second business task record corresponding to the business task identified from the content included in the request;
determining whether the current business task associated with the user is incompatible with the business task identified from the content included in the request by determining whether a first logical permission corresponding to the first logical permission record is incompatible with a second logical permission corresponding to the second logical permission record; and
based on whether the current business task associated with the user is incompatible with the business task identified from the content included in the request, either providing an indication that the request would result in a separation-of-duties violation or fulfilling the request.

2. The method of claim 1 wherein:
fulfilling the request comprises adjusting access rights to at least one physical computing resource of a computer system based on the content included in the request.

3. The method of claim 2 wherein:
providing the indication that the request would result in a separation-of-duties violation comprises notifying a reviewer that the request represents a separation-of-duties violation, and
the request is fulfilled responsive to dismissal of the separation-of-duties violation by the reviewer.

4. The method of claim 1 wherein:
providing the indication that the request would result in a separation-of-duties violation comprises providing notification to a requestor indicated in the request that the request was denied.

5. The method of claim 1 wherein:
the request specifies a request type; and
identifying the business task based on the content included in the request comprises identifying the business task based, at least in part, on the request type.

6. The method of claim 1 wherein:
the IAM data model further defines a third relationship between the business task entity and a business activity entity and further defines a fourth relationship between the business activity entity and a business role entity;
the records stored at the database further comprise (d) a set of business activity records, each business activity record corresponding to the business activity entity, and (e) a set of business role records, each business role record corresponding to the business role entity;
the request specifies a business role; and
identifying the business task based on the content included in the request comprises
querying the database for a business role record that corresponds to the business role;
querying the database for one or more business activity records associated with the business role record,
for each business activity record, querying the database for one or more business task records associated with the business activity record,
selecting one of the one or more business task records as the first business task record.

7. The method of claim 1 wherein:
the IAM data model further defines a third relationship between the business task entity and a business activity entity;
the records stored at the database further comprise (d) a set of business activity records, each business activity record corresponding to the business activity entity;
the request specifies a business activity; and
identifying the business task based on the content included in the request comprises
querying the database for a business activity record that corresponds to the business activity,
querying the database for one or more business task records associated with the business activity record, and
selecting one of the one or more business task records as the first business task record.

8. The method of claim 1 wherein:
the request specifies the business task.

9. The method of claim 1 wherein:
fulfilling the request comprises
deriving a logical entitlement from the first logical permission associated with the business task,
translating the logical entitlement into one or more physical entitlements wherein each one of the one or more physical entitlements identifies, respectively, a physical computing resource and one or more physical permissions used to access the physical computing resource, and
initiating, for each one of the one or more physical computing resources, provisioning of the one or more physical permissions for the requestee specified in the request.

10. A system for verifying separation-of-duties for requested access rights to physical computing resources comprising:
one or more processors;
a database that implements an identity access management (IAM) data model the IAM data model defining a first relationship between a user entity and a business task entity and defining a second relationship between the business task entity and a logical permission entity;
records stored at the database, the records comprising (a) a set of user records, each user record conforming to the user entity, (b) a set of business task records, each business task record conforming to the business task entity, and (c) a set of logical permission records, each logical permission record conforming to the logical permission entity; and memory storing instructions that when executed by one of the processors, cause the system to receive a request to provision one or more access rights for a user specified in the request, identify a business task to provision one or more access rights for based on content included in the request, query the database for a first logical permission record that is associated with a first business task record that is associated with a user record corresponding to the user specified in the request, the first business task record corresponding to a current business task associated with the user specified in the request, query the database for a second logical permission record that is associated with a second business task record corresponding to the business task identified from the content included in the request;

determine whether the current business task associated with the user is incompatible with the business task identified from the content included in the request by determining whether a first logical permission corresponding to the first logical permission record is incompatible with a second logical permission corresponding to the second logical permission record, and based on whether the current business task associated with the user is incompatible with the business task identified from the content included in the request, either provide an indication that the request would result in a separation-of-duties violation or fulfill the request.

11. The system of claim 10 wherein:
the IAM data model further defines a third relationship between the business task entity and a business activity entity and further defines a fourth relationship between the business activity entity and a business role entity;
the records stored at the database further comprise (d) a set of business activity records, each business activity record corresponding to the business activity entity, and (e) a set of business role records, each business role record corresponding to the business role entity;
the request specifies a business role; and
identifying the business task based on the content included in the request comprises
querying the database for a business role record that corresponds to the business role,
querying the database for one or more business activity records associated with the business role record,
for each business activity record, querying the database for one or more business task records associated with the business activity record,
selecting one of the one or more business task records as the first business task record.

12. The system of claim 10 wherein:
the IAM data model further defines a third relationship between the business task entity and a business activity entity;
the records stored at the database further comprise (d) a set of business activity records, each business activity record corresponding to the business activity entity;
the request specifies a business activity; and
identifying the business task based on the content included in the request comprises querying the database for a business activity record that corresponds to the business activity,
querying the database for one or more business task records associated with the business activity record, and
selecting one of the one or more business task records as the first business task record.

13. The system of claim 10 wherein:
the request specifies the business task.

14. A non-transitory computer-readable storage medium having instructions stored thereon that, when executed by a processor, cause the processor to perform steps for verifying separation-of-duties for requested access rights to physical computing resources, the steps comprising:

providing a database that implements an identity and access management (IAM) data model, the IAM data model defining a first relationship between a user entity and a business task entity and defining a second relationship between the business task entity and a logical permission entity;

storing, at the database, (a) a set of user records, each user record conforming to the user entity, (b) a set of business task records, each business task record conforming to the business task entity, and (c) a set of logical permission records, each logical permission record conforming to the logical permission entity;

receiving a request to provision one or more access rights for a user specified in the request;

identifying a business task to provision one or more access rights for based on content included in the request;

querying the database for a first logical permission record that is associated with a first business task record that is associated with a user record corresponding to the user specified in the request, the first business task record corresponding to a business task associated with the user specified in the request;

querying the database for a second logical permission record that is associated with a second business task record corresponding to the business task identified from the content included in the request;

determining whether the current business task associated with the user is incompatible with the business task identified from the content included in the request by determining whether a first logical permission corresponding to the first logical permission record is incompatible with a second logical permission corresponding to the second logical permission record; and based on whether the current business task associated with the user is incompatible with the business task identified from the content included in the request, either providing an indication that the request would result in a separation-of-duties violation or fulfilling the request.

15. The non-transitory computer-readable medium of claim 14 wherein the instructions, when executed by the processor, cause the processor to perform steps further comprising:

storing, at the database, (d) a set of logical computing resource records, each logical computing resource record conforming to a logical computing resource entity defined by the IAM data model and corresponding to a logical computing resource of a computer system; and storing, at the database, (e) a set of physical computing resource records, each physical computing resource record conforming to a physical computing resource entity defined by the IAM data model and corresponding to a physical computing resource of the computer system;

wherein the IAM data model defines a relationship between the logical computing resource entity and the physical computing resource entity and wherein each logical computing resource record is associated with one or more of the physical computing resource records.

16. The non-transitory computer-readable medium of claim 14 wherein:

the IAM data model further defines a third relationship between the business task entity and a business activity entity and further defines a fourth relationship between the business activity entity and a business role entity;

the records stored at the database further comprise (d) a set of business activity records, each business activity record corresponding to the business activity entity, and (e) a set of business role records, each business role record corresponding to the business role entity;

the request specifies a business role; and identifying the business task based on the content included in the request comprises querying the database for a business role record that corresponds to the business role, querying the database for one or more business activity records associated with the business role record, for each business activity record, querying the database for one or more business task records associated with the business activity record, selecting one of the one or more business task records as the first business task record.

17. The non-transitory computer-readable medium of claim 14 wherein:

the IAM data model further defines a third relationship between the business task entity and a business activity entity;

the records stored at the database further comprise (d) a set of business activity records, each business activity record corresponding to the business activity entity;

the request specifies a business activity; and identifying the business task based on the content included in the request comprises querying the database for a business activity record that corresponds to the business activity, querying the database for one or more business task records associated with the business activity record, and selecting one of the one or more business task records as the first business task record.

18. The non-transitory computer-readable medium of claim 14 wherein:

the request specifies the business task.

19. The non-transitory computer-readable medium of claim 14 wherein:

fulfilling the request comprises deriving a logical entitlement from the first logical permission associated with the business task, translating the logical entitlement into one or more physical entitlements wherein each one of the one or more physical entitlements identifies, respectively, a physical computing resource and one or more physical permissions used to access the physical computing resource, and initiating, for each one of the one or more physical computing resources, provisioning of the one or more physical permissions for the requestee specified in the request.

* * * * *